United States Patent
Zych

(10) Patent No.: US 9,062,983 B2
(45) Date of Patent: Jun. 23, 2015

(54) TERRAIN CLASSIFICATION SYSTEM FOR A VEHICLE

(71) Applicant: Oshkosh Corporation, Oshkosh, WI (US)

(72) Inventor: Noah Zych, Washington, DC (US)

(73) Assignee: Oshkosh Defense, LLC, Oshkosh, WI (US)

(*) Notice: Subject to any disclaimer, the term of this patent is extended or adjusted under 35 U.S.C. 154(b) by 0 days.

(21) Appl. No.: 13/791,573

(22) Filed: Mar. 8, 2013

(65) Prior Publication Data

US 2014/0257621 A1  Sep. 11, 2014

(51) Int. Cl.
*G01C 21/34* (2006.01)

(52) U.S. Cl.
CPC .................................. *G01C 21/3453* (2013.01)

(58) Field of Classification Search
CPC ........... G01C 21/3453; G01C 21/3492; G05D 1/0246; G05D 1/0248; G05D 1/0251; G05D 1/0255; G05D 1/0257
USPC ......... 701/25, 26, 28, 416; 348/135; 700/245, 700/253, 258, 259; 704/226
See application file for complete search history.

(56) References Cited

U.S. PATENT DOCUMENTS

| | | | |
|---|---|---|---|
| 5,521,594 A * | 5/1996 | Fukushima | 340/901 |
| 6,615,648 B1 * | 9/2003 | Ferguson et al. | 73/146 |
| 6,807,473 B1 | 10/2004 | Tran | |
| 7,149,611 B2 * | 12/2006 | Beck et al. | 701/2 |
| 7,761,236 B2 | 7/2010 | Samukawa et al. | |
| 7,941,189 B2 | 5/2011 | Miyauchi | |
| 8,036,821 B2 | 10/2011 | Cornett et al. | |
| 2005/0024492 A1 | 2/2005 | Schaefer et al. | |
| 2005/0195096 A1 | 9/2005 | Ward et al. | |
| 2010/0013615 A1 | 1/2010 | Hebert et al. | |
| 2010/0098290 A1 | 4/2010 | Zhang et al. | |
| 2011/0077813 A1 * | 3/2011 | Hadsell et al. | 701/26 |
| 2011/0224901 A1 * | 9/2011 | Aben et al. | 701/208 |
| 2013/0282278 A1 * | 10/2013 | Klassen et al. | 701/521 |

FOREIGN PATENT DOCUMENTS

KR  2002030973  *  4/2002  ............... G08G 1/14

* cited by examiner

*Primary Examiner* — Marthe Marc-Coleman
(74) *Attorney, Agent, or Firm* — Foley & Lardner LLP

(57) ABSTRACT

A terrain classification system for a vehicle includes a sensor positioned to scan a surrounding terrain, the sensor providing a sensor signal representative of returns from scanning the surrounding terrain. The terrain classification system also includes a processing circuit configured to receive the sensor signal, classify the surrounding terrain using the sensor signal, evaluate a library of acoustic data to determine an expected acoustic signature that corresponds to the classified surrounding terrain, and create an acoustic cost map with the expected acoustic signature.

20 Claims, 15 Drawing Sheets

TERRAIN CLASSIFICATION SYSTEM FOR A VEHICLE

BACKGROUND

The present application generally relates to sensor systems for vehicles. In particular, the present application relates to a terrain classification system for a vehicle. Vehicles create acoustic disturbances as they traverse terrain. Such terrain may include gravel, sand, pavement, asphalt, brush, vegetation, or still other surfaces. A vehicle may create different levels of acoustic disturbances (e.g., as measured in decibels) as it traverses different types of terrain.

Traditional route determination systems for manned, semi-autonomous, and autonomous vehicles may incorporate various control schemes. By way of example, an autonomous vehicle may navigate based on rules that reinforce behaviors such as staying in a lane on a road or taking the smoothest, shortest, or least physically hazardous path from a current location to a destination. However, the acoustic signature of a vehicle (i.e. the sounds that the vehicle may produce) traversing a path may not be considered in determining a preferred path. The lack of consideration for a vehicles acoustic signature may be problematic in some settings. For example, warfighters may be hesitant to deploy autonomous vehicles (e.g., squad support robots to carry loads for them) because the vehicles may give away their position.

SUMMARY

One embodiment of the invention relates to a terrain classification system for a vehicle. The terrain classification system includes a sensor positioned to scan a surrounding terrain, the sensor providing a sensor signal representative of returns from scanning the surrounding terrain. The terrain classification system also includes a processing circuit configured to receive the sensor signal, classify the surrounding terrain using the sensor signal, evaluate a library of acoustic data to determine an expected acoustic signature that corresponds to the classified surrounding terrain, and create an acoustic cost map with the expected acoustic signature.

Another embodiment of the invention relates to a vehicle. The vehicle includes a chassis; a sensor coupled to the chassis and positioned to scan a surrounding terrain, the sensor providing a sensor signal representative of returns from scanning the surrounding terrain; and a processing circuit. The processing circuit is configured to receive the sensor signal, classify the surrounding terrain using the sensor signal, evaluate a library of acoustic data to determine an expected acoustic signature that corresponds to the classified surrounding terrain, and create an acoustic cost map with the expected acoustic signature.

Yet another embodiment of the invention relates to a method of operating a terrain classification system for a vehicle. The method includes scanning a surrounding terrain with a sensor; classifying the surrounding terrain; evaluating a library of acoustic data to determine an expected acoustic signature; associating the expected acoustic signature with the surrounding terrain; and creating an acoustic cost map with the expected acoustic signature.

The invention is capable of other embodiments and of being carried out in various ways. Alternative exemplary embodiments relate to other features and combinations of features as may be recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring to the figures, a vision system for a vehicle is shown and described. The vision system may be configured to determine acoustic information related to vehicle operation. The vision system may use the acoustic information to determine a route for the vehicle. The route for the vehicle may be a route that minimizes an acoustic signature of the vehicle (e.g., minimizes the sound the vehicle makes when traveling, minimizes the nature or profile of the sound the vehicle creates, etc.).

According to an exemplary embodiment, the vision system may receive various inputs from sensors configured to scan surrounding terrain and microphones configured to sense acoustic signatures during vehicle movement. The vision system may receive the signals and use the signals to determine an observed or expected acoustic signature (e.g., acoustic information of the vehicle for the surrounding terrain). The vision system may also utilize a training library containing acoustic information.

Based on the acoustic signature, the vision system may create an acoustic cost map. The acoustic cost map may include a map of discrete areas, with each discrete area having a corresponding acoustic signature. According to an exemplary embodiment, the acoustic cost map may describe, along with other information, the potential acoustic profile of a vehicle if it were to traverse over an area.

Using the acoustic cost map, the vision system may determine a route or path for the vehicle. The vision system may consider several potential routes and determine an acoustic cost for each route using the acoustic cost map and other information. The route may include a starting location and a target location. The vision system may then select the best route (e.g., the route with the least acoustic cost). The route may be provided to a vehicle control system of the vehicle (e.g., of an autonomous vehicle) or to a display for a user at least partially controlling the vehicle operation.

Figure 1:
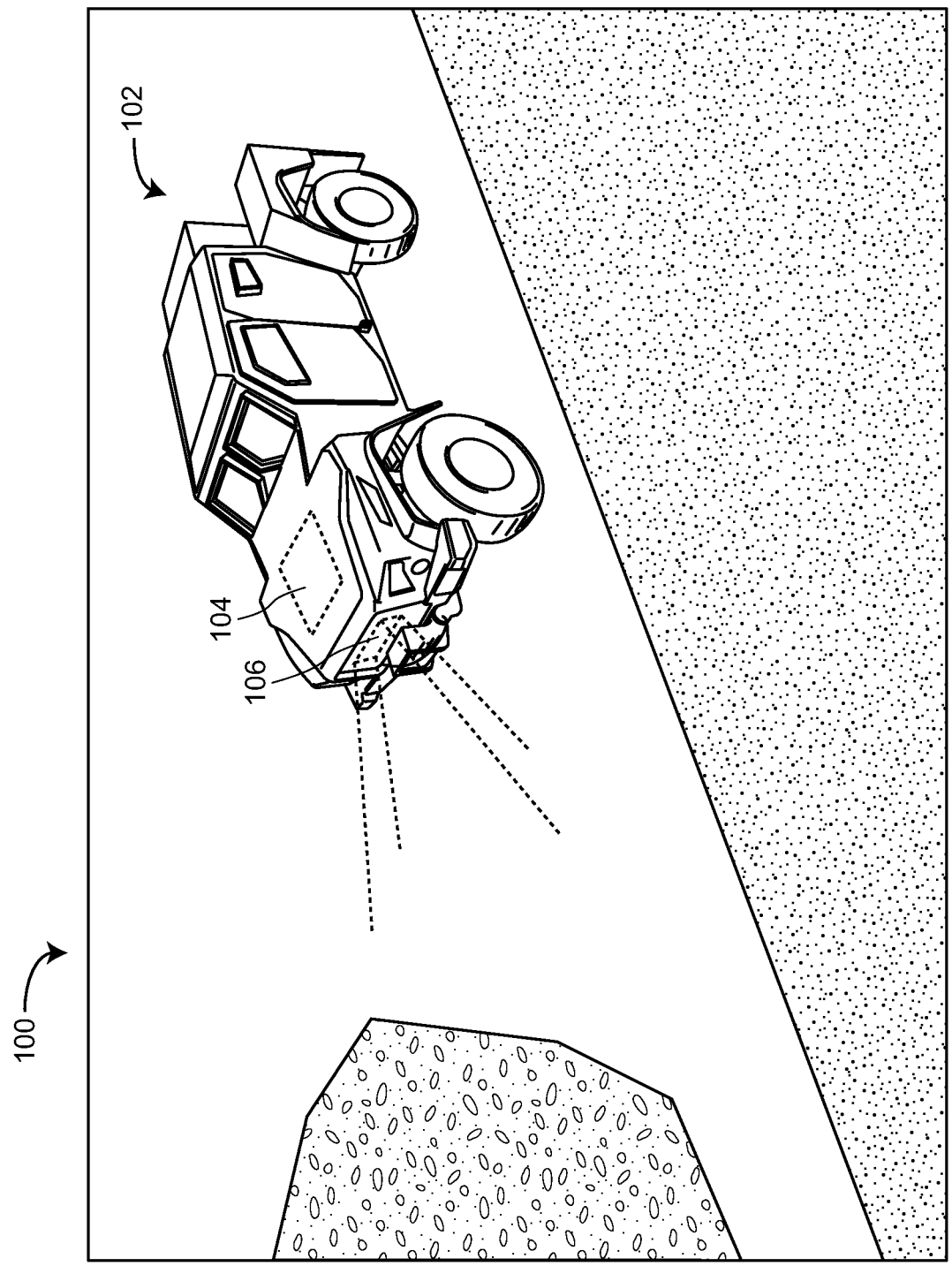
FIG. 1 is an elevation view of a vehicle including a vision system, according to an exemplary embodiment.

Referring to FIG. 1, a view of a vehicle, shown as truck 102, in an environment 100 is illustrated, according to an exemplary embodiment. Truck 102 includes a vision system 104 configured to determine acoustic information related to vehicle operation. According to an exemplary embodiment, vision system 104 may control vehicle operation based on the acoustic information. As shown in FIG. 1, vision system 104 receives input from one or more sensors 106. Sensors 106 may be configured to scan a surrounding area and provide sensor signals to be analyzed by vision system 104.

According to the exemplary embodiment shown in FIG. 1, truck 102 is a heavy-duty military vehicle. As shown in FIG. 1, truck 102 includes a chassis (i.e. frame, body, etc.) and sensors 106 coupled to the chassis. According to an exemplary embodiment, truck 102 is an autonomous vehicle (i.e. an unmanned vehicle, a vehicle driven remotely, a vehicle operated according to a control scheme, etc.). Vision system 104 may interface with a vehicle control system where the autonomous vehicle operates without active oversight by an operator. According to an alternative embodiment, truck 102 is a manned vehicle, and vision system 104 interfaces with a display to provide an operator of truck 102 with acoustic information, routes, and other information.

According to an exemplary embodiment, sensor 106 is a LIDAR scanner. According to an alternative embodiment, sensor 106 is a RADAR sensor. In either embodiment, sensor 106 may be configured to sense a terrain unit (i.e. a portion of terrain in environment 100). Sensor 106 may alternatively include a camera or other device configured to capture images of terrain for use by vision system 104. The camera may be designed to operate in the visible spectrum, in the infrared spectrum (e.g., to facilitate scanning a surrounding terrain at night), or include active illumination that is undetectable by humans. According to an alternative embodiment, sensor 106 includes a microphone (i.e. an audio input device) configured to sense an acoustic signature as truck 102 maneuvers through environment 100. It should be understood that any combination of these or other sensors may be included as part of vision system 104.

In some embodiments, vision system 104 includes an instrument that interacts with sensor 106 to scan environment 100. The instrument may include a driver (e.g., motor, actuator, etc.) that moves sensor 106 to direct a scanning beam toward different portions of environment 100. According to an exemplary embodiment, the driver rotates sensor 106 around an axis to direct the scanning beam at least partially around vehicle 102. According to an alternative embodiment, the driver actuates sensor 106 along a scanning pattern within each terrain unit (i.e., systematically direct the scanning beam along rows, columns, or other portions within a terrain unit, engage in a sweep of environment 100, etc.). According to another alternative embodiment, sensor 106 remains stationary and the instrument is a wave guide that directs a scanning beam toward discrete terrain units. According to yet another alternative embodiment, sensor 106 may scan a first terrain unit with a first frequency and scan a second terrain unit with a second frequency.

According to the exemplary embodiment shown in FIG. 1, sensors 106 are positioned in the front of truck 102. According to various alternative embodiments, sensors 106 may be positioned in other locations of truck 102 (e.g., on the roof, underneath the bottom of the vehicle, in the back of the vehicle, etc.). As shown in FIG. 1, sensors 106 may interface with (i.e. scan) a terrain unit in front of the vehicle or in the path of the vehicle.

Figure 2:
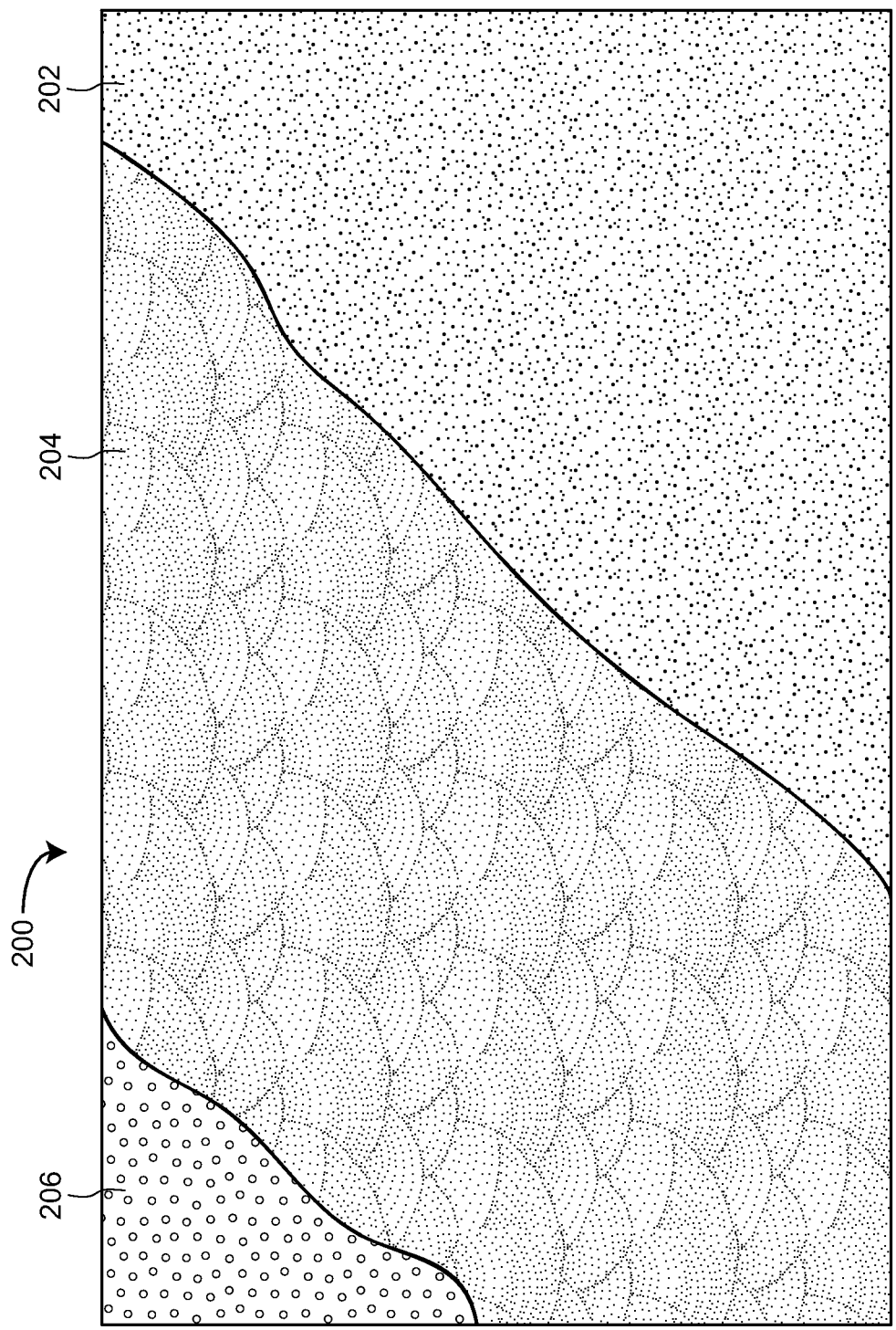
FIG. 2 illustrates an overhead view of a scene including different types of terrain, according to an exemplary embodiment.

Referring next to the exemplary embodiment shown in FIG. 2, a vision system may be configured to generate a graphical representation (e.g., a scene) of terrain and terrain properties for display. According to an alternative embodiment, such a scene may be generated as data for internal use within the vision system. As shown in FIG. 2, an environment 200 is an exemplary scene that a vision system may analyze. Environment 200 is illustrated in FIG. 2 as an overhead view of a terrain area. According to an exemplary embodiment, environment 200 includes various types of terrain 202, 204, 206. In some embodiments, terrain 202 may be asphalt, terrain 204 may be sand, and terrain 206 may be water.

It should be understood that truck 102 may produce different acoustic signatures as it drives over different surfaces or objects in the terrain. According to an exemplary embodiment, sensors 106 are configured to detect and identify various types of terrain within the surrounding environment. For example, sensors 106 may detect and identify sand, gravel, cement, grass, asphalt, or still other materials. Further, sensors 106 may be configured to detect small objects (e.g., leaves, twigs, small rocks, weeds, brush, etc.) that may impact noise levels, and vision system 104 may characterize the terrain via the detected objects.

Figure 3A:
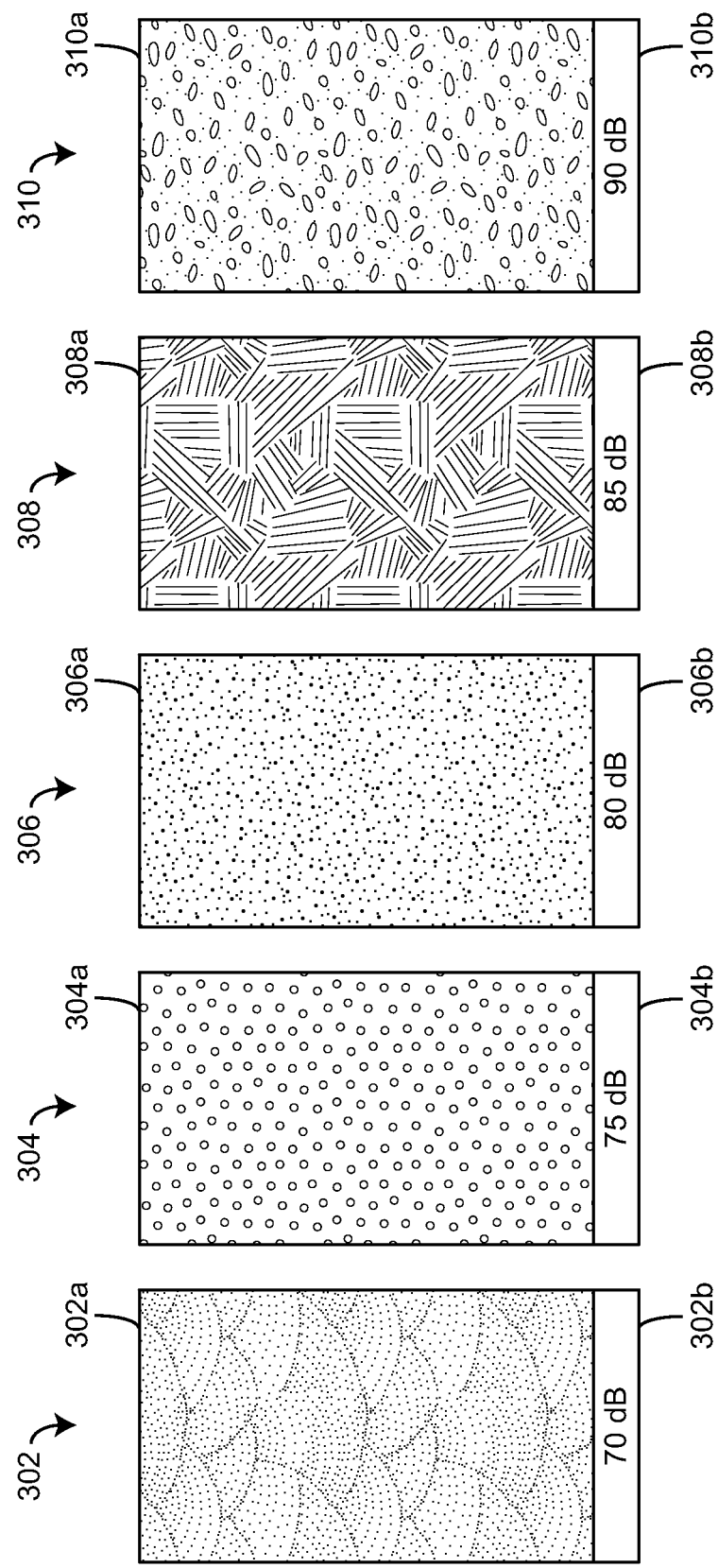
FIGS. 3A-B illustrate examples of acoustic data related to terrain, according to exemplary embodiments.
Figure 3B:
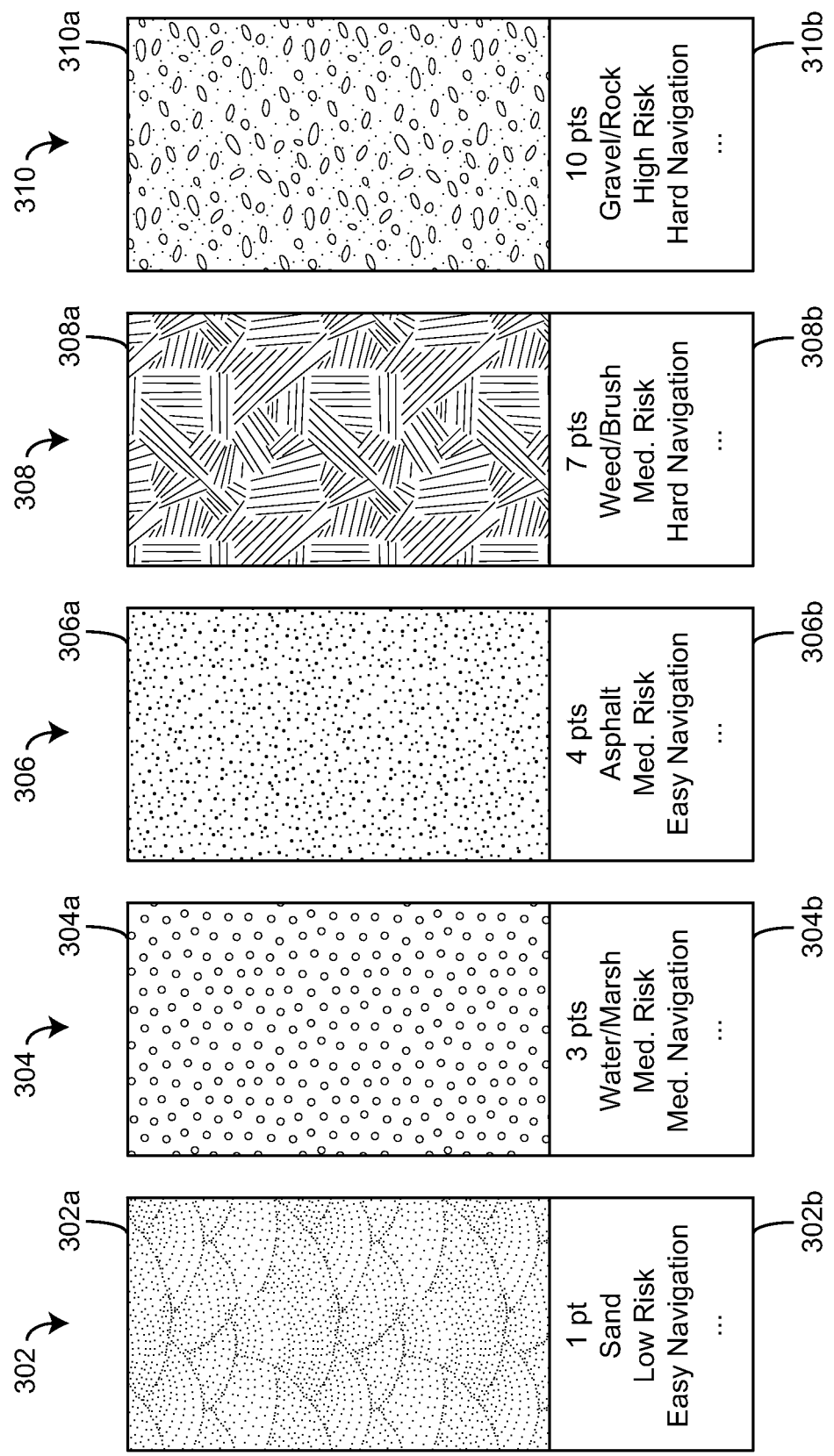

Referring next to the exemplary embodiment shown in FIGS. 3A-3B, a vision system may characterize the terrain using information from a training library. According to an exemplary embodiment, a training library includes a database having acoustic data for different types of terrain. Acoustic data that may be stored in a training library are shown in FIGS. 3A-3B, according to an exemplary embodiment. In the embodiment of FIG. 3A, five different sample types of terrain 302, 304, 306, 308, 310 are shown. As shown in FIG. 3A, each terrain sample may have a corresponding image (302a, 304a, 306a, 308a, 310a). Using the images or data stored in the training library and the images or data obtained from a camera device or generated using sensor input, the terrain in environment 200 may be associated with a corresponding terrain in the training library. By way of example, terrain 202 may correspond with terrain 306, terrain 204 may correspond with terrain 302, and terrain 206 may correspond with terrain 304.

In addition to profiles of terrain, the training library may include corresponding acoustic data. As shown in FIG. 3A, the training library includes a corresponding decibel level 302b, 304b, 306b, 308b, and 310b the sample types of terrain. According to an exemplary embodiment, the decibel level includes a noise level that may result if the vehicle maneuvers over the terrain. For example, for sand 302a, the noise level created by truck 102 traversing over sand may be estimated at 10 decibels (dB). As shown in FIG. 3A, the decibel level may be 70 decibels (dB) for terrain 302, 75 dB for terrain 304, 80 dB for terrain 306, 85 dB for terrain 308, and 90 dB for terrain 310. According to an alternative embodiment, the training library includes a corresponding frequency profile for the sample types of terrain. According to still another alternative embodiment, the training library includes a corresponding volume and frequency spectrum for the sample types of terrain. A certain volume over a certain frequency spectrum (e.g., 22 dB having a frequency between twelve and thirteen kilohertz) may be particularly detectable (e.g., by humans, by sensors, etc.).

As shown in FIG. 3B, the training library may include additional or different acoustic data (e.g., a sound wave profile, another acoustic profile, shapes of a wave, intensity, duration, etc.) relating to samples of terrain 302, 304, 306, 308, 310. According to an exemplary embodiment, the acoustic data includes a score related to the decibel level or acoustic signature of a particular type of terrain. In some embodiments, the score may be an indication of a noise level of the particular terrain type relative to noise levels of other terrain types. As shown in FIG. 3B, 1 point is assigned to sand, 3 points is assigned to water, 4 points is assigned to asphalt, 7 points is assigned to brush, and 10 points is assigned to gravel. According to an alternative embodiment, different point levels may be associated with these or other types of terrain.

Referring still to the exemplary embodiment shown in FIG. 3B, the acoustic data also includes a description of the terrain. The description may include one or two words identifying the terrain (e.g., "sand," "brush," "gravel," etc.) or a larger description. As shown in FIG. 3B, the acoustic data may further include information relating to a risk level associated with the terrain. Such a risk level may include stealth considerations (e.g., a likelihood that the vehicle may be discovered by hostiles). Referring again to FIG. 3B, the acoustic data may include information relating to the ability of the vehicle to maneuver over the terrain. By way of example, characteristics of the vehicle (e.g., size, shape, etc.) may make it difficult for the vehicle to navigate through water, muddy areas, over rocky terrain, etc. It should be understood that the acoustic data may include any information relating to the acoustic profile of the vehicle for various types of terrain.

Figure 4A:
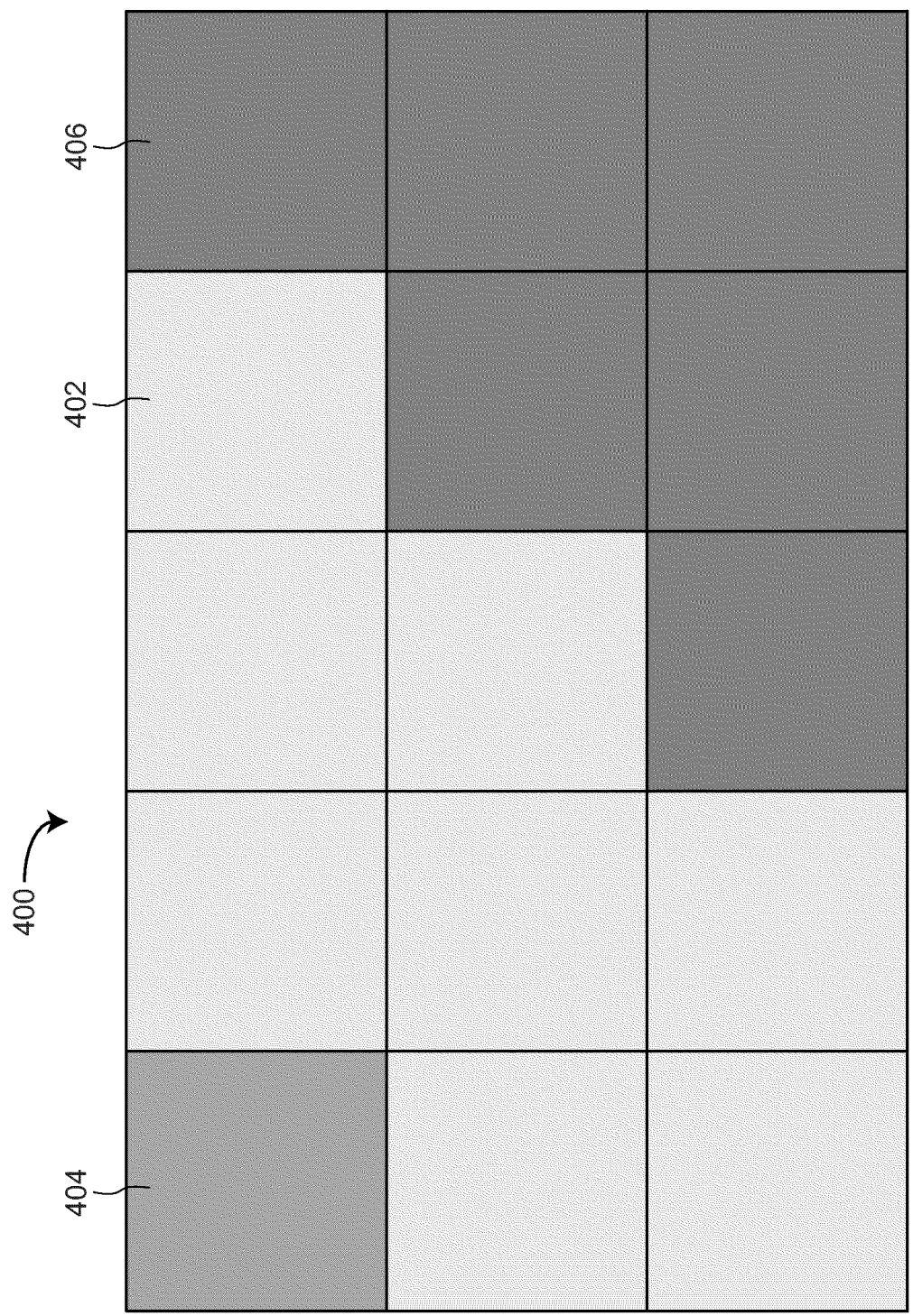
FIGS. 4A-B illustrate examples of acoustic cost maps based on the acoustic data and scene of FIG. 2, according to exemplary embodiments.
Figure 4B:
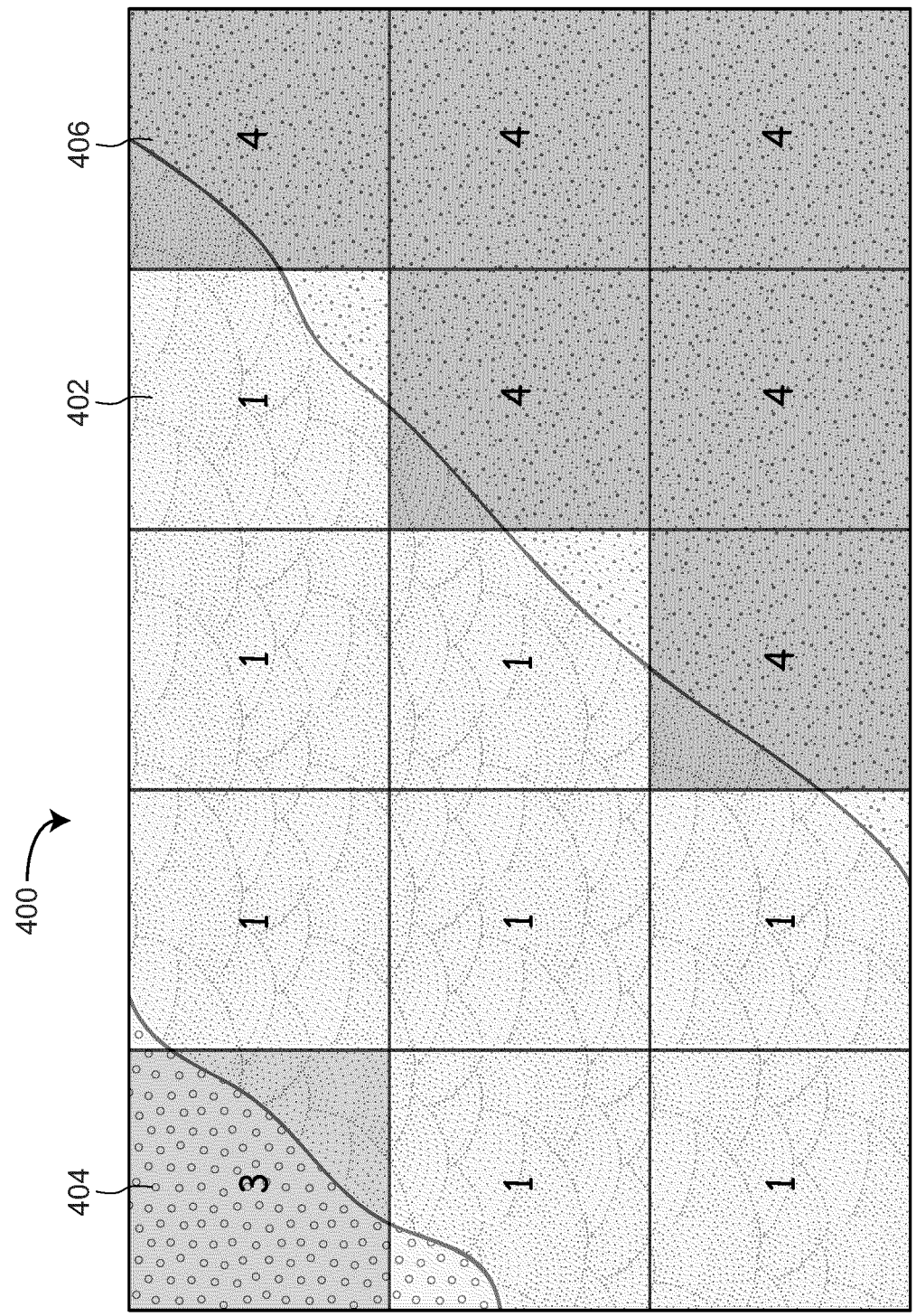

Referring next to the exemplary embodiments shown in FIGS. 4A-B, examples of acoustic cost maps are shown. Such acoustic cost maps may be produced by vision system 104 based on a scene as identified by sensors. In some embodiments, the acoustic cost map indicates an acoustic cost of a vehicle traversing over different areas in environment 200. Acoustic cost maps may be displayed to an operator of truck 102, according to an exemplary embodiment. Displaying an acoustic cost map improves an operator's ability to evaluate a surrounding terrain during adverse conditions (e.g., foggy conditions, at night, during heavy rain, during a snow or sand storm, etc.). According to an alternative embodiment, the acoustic cost map may be generated and used as part of an internal process (e.g., as data within memory).

In the embodiment shown in FIG. 4A, acoustic cost map 400 is based on environment 200. As shown in FIGS. 4A-4B, acoustic cost map 400 is divided into equal terrain units, with each terrain unit representing a portion of the terrain. As shown in FIG. 4B, an acoustic cost may be associated with each terrain unit. The acoustic cost of terrain units may be illustrated (e.g., to an operator) on the acoustic cost map in various ways. Different colors, shades of colors, or other features may be used to represent the acoustic cost for each unit. For example, lighter colors or shades may represent a lower acoustic cost for a unit. According to the exemplary embodiment shown in FIG. 4A, terrain unit 402 corresponds with the lowest acoustic cost, terrain unit 404 corresponds with a higher acoustic cost, and terrain unit 406 corresponds with the highest acoustic cost.

Referring to the alternative embodiment of FIG. 4B, acoustic cost map 400 may include still other information. According to an exemplary embodiment, acoustic cost map 400 is displayed to an operator. In some embodiments, each terrain unit (402, 404, 406) may be at least partially transparent to allow an operator to view a scene along with acoustic cost map 400. For example, at terrain unit 402, the operator may see that the low acoustic cost may correspond with a sandy portion of the surrounding terrain. As shown in FIG. 4B, the display may include text (e.g., numbers) indicative of an acoustic cost for each unit. In the exemplary embodiment of FIG. 4B, a score is shown for each unit. Acoustic cost map 400 may additionally or alternatively display other terrain information for each unit (e.g., information as illustrated in fields 302b-310b of FIGS. 3A-B).

In the exemplary embodiments of FIGS. 4A-B, the size of the terrain units are shown as equal sized and geometrically shaped. In various alternative embodiments, the vision system may vary the size of the terrain units based on the terrain or other factors. Further, the vision system may shape the terrain units as any type of geometric or irregular shape, according to an alternative embodiment.

Figure 5:
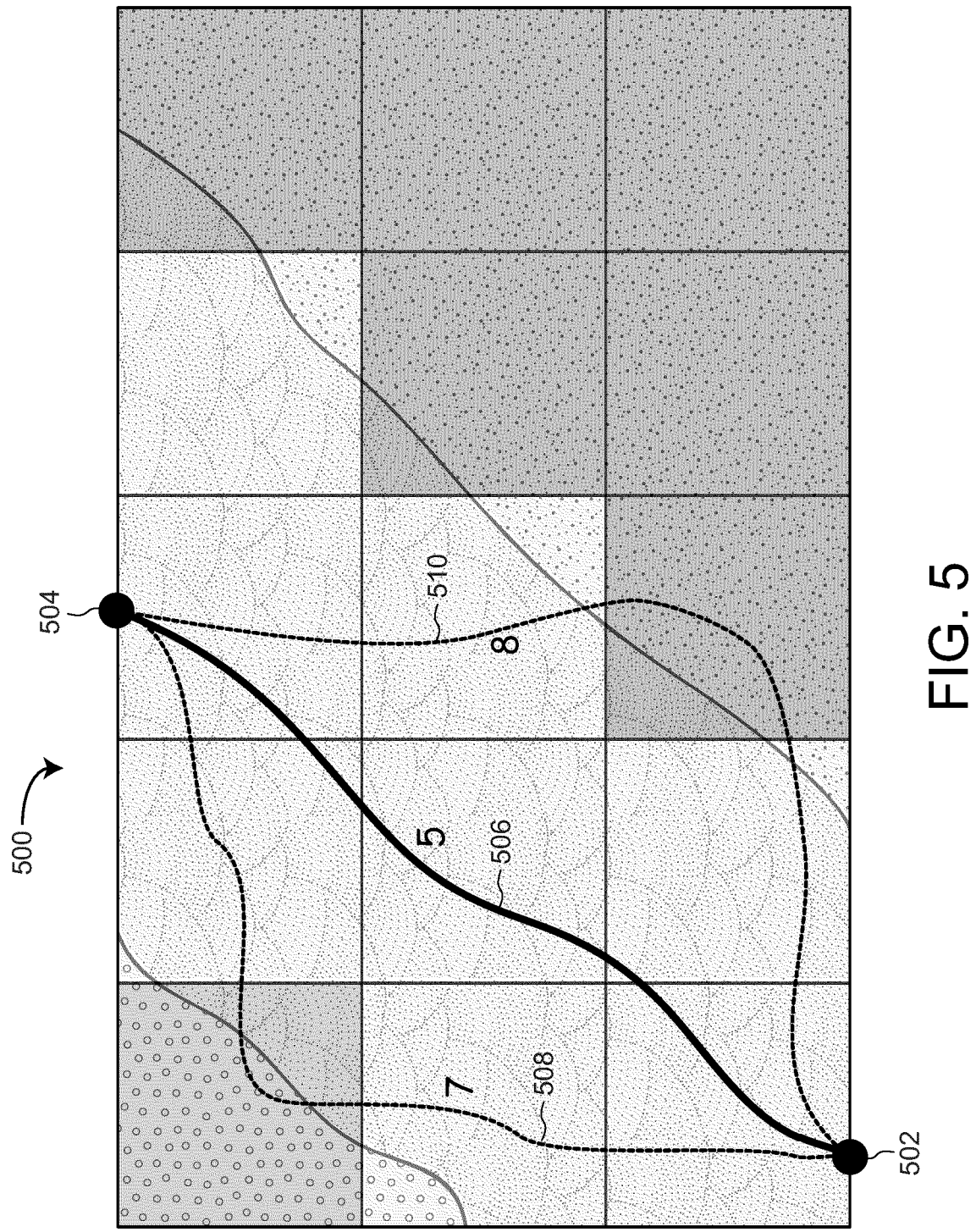
FIG. 5 illustrates an example of a display including route information based on the acoustic data and acoustic cost maps, according to an exemplary embodiment.

According to an exemplary embodiment, the vision system determines one or more possible routes or paths a vehicle may take through the environment. Referring to FIG. 5, an example display, shown as display 500, is illustrated that includes possible routes or paths truck 102 may take based on the acoustic data and an acoustic cost map. Display 500 may be provided to an operator (e.g., on a display) and include route information displayed along with an acoustic cost map. In other embodiments, route information may be provided on a display that does not include an acoustic cost map or acoustic cost information. In still other embodiments, route information may be provided on a display that does include some acoustic cost information.

Referring again to the exemplary embodiment shown in FIG. 5, display 500 is shown to include a starting location 502, target location 504, and possible routes (i.e. potential paths) 506, 508, 510. Vision system 104 may determine possible routes 506, 508, 510 based on the acoustic cost map and other acoustic information along with other information related to vehicle operation and strategy. For example, vision system 104 may identify possible routes 506, 508, 510 as possible routes based on acoustic information. In other embodiments, possible routes 506, 508, 510 may be predetermined routes (e.g., identified by an operator) without regard to the acoustic information. In still other embodiments, possible routes 506, 508, 510 may be predetermined routes selected because of the determined acoustic data. Vision system 104 may select a preferred route (e.g., route 506 in FIG. 5) based on the acoustic cost associated with the route. For example, the acoustic cost associated with route 506 may be less than the acoustic cost associated with the other routes. Display 500 illustrates route 506 as a solid line and other, evaluated routes as dotted lines. In the exemplary embodiment of FIG. 5, the acoustic cost for each route (e.g., 5, 7, and 8 respectively) may be displayed alongside each route thereby allowing an operator to view or analyze routes and route information. The creation, selection, and display of routes are described in greater detail with reference to route determination module 916 of FIG. 10C.

Figure 6:
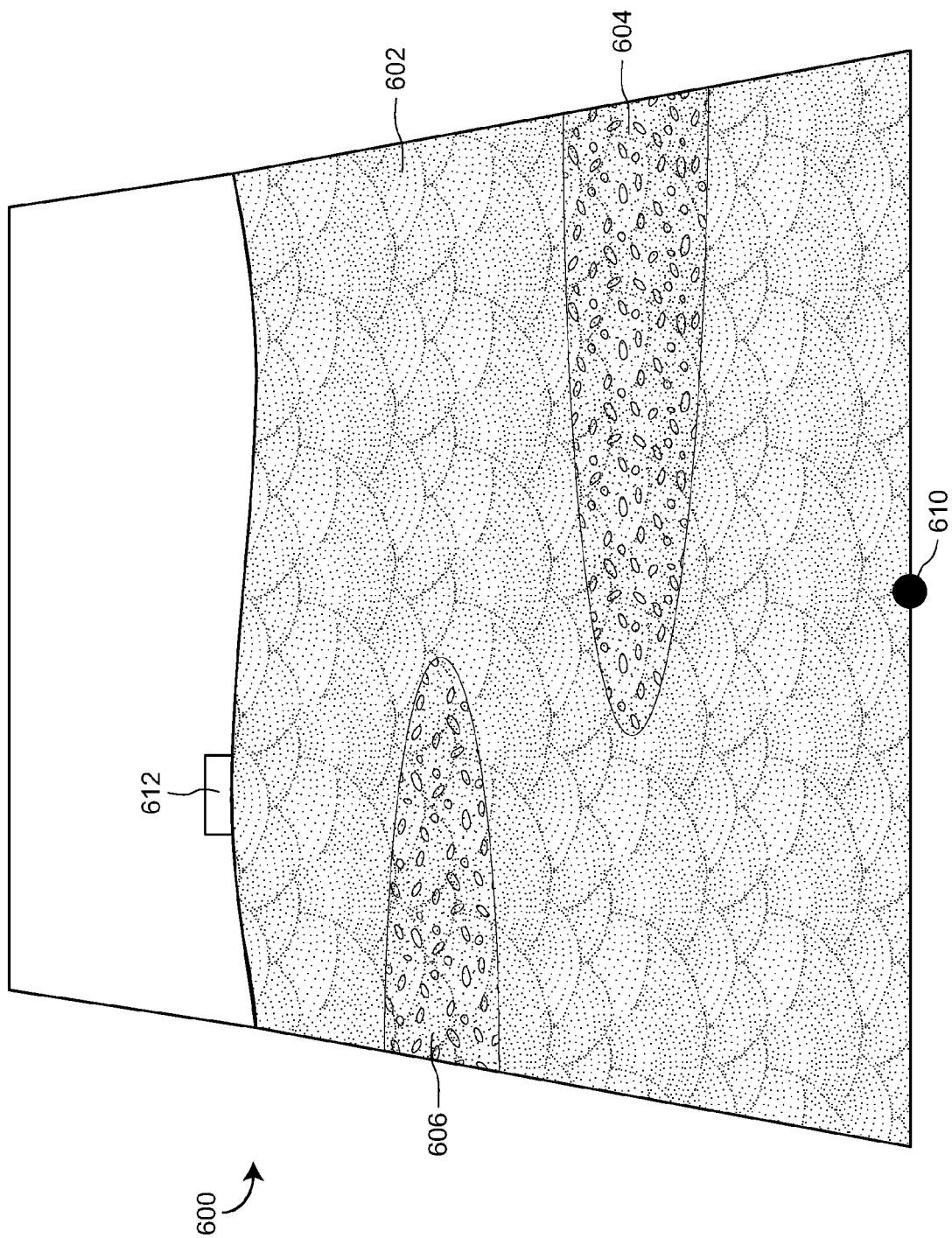
FIG. 6 illustrates a front view of another example scene; according to an exemplary embodiment.
Figure 7:
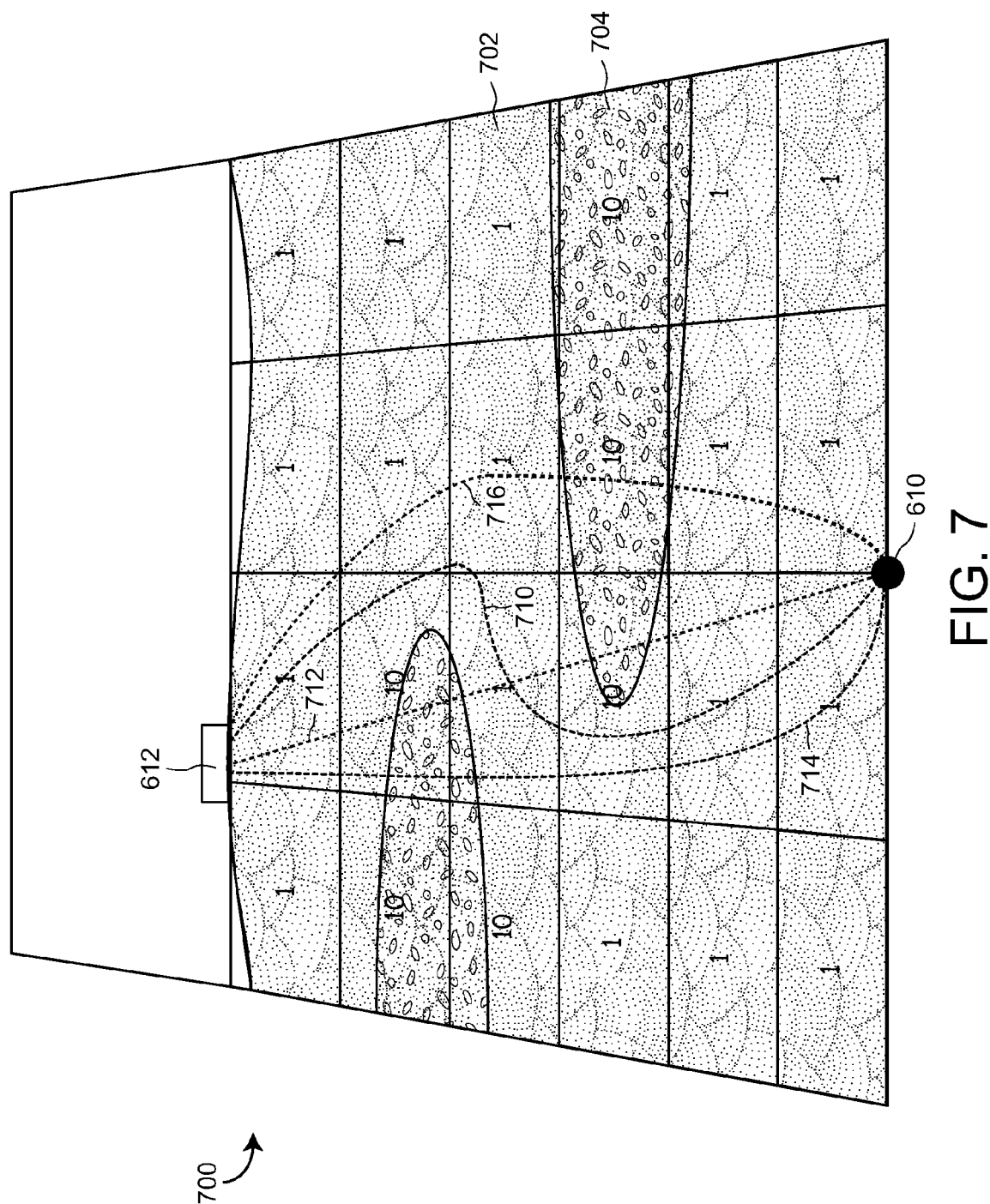
FIG. 7 illustrates an example of an acoustic cost map and possible routes through a scene, according to an exemplary embodiment.
Figure 8:
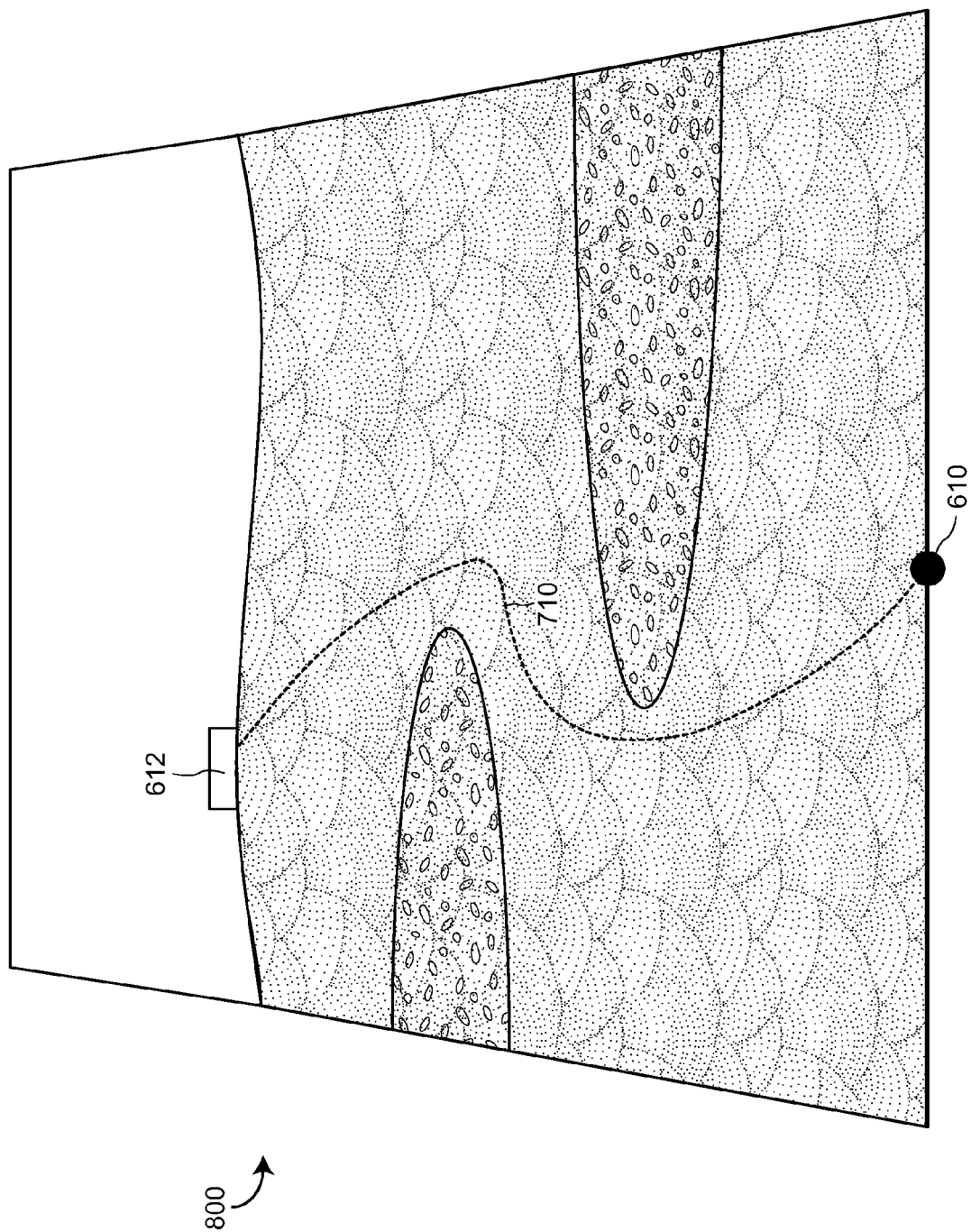
FIG. 8 illustrates a selected route for a test scene, according to an exemplary embodiment.

Referring next to FIGS. 6-8, an alternative example environment, acoustic cost map, and route determination are shown, according to an alternative embodiment. Referring to FIG. 6, a front perspective view of a terrain area is illustrated (e.g., the environment and terrain shown in FIG. 6 is in front of the vehicle). This front perspective view may simulate a view that an operator of a vehicle may have looking out the front windshield. As shown in FIG. 6, an environment, shown as environment 600 includes a starting location, shown as starting location 610, that indicates the current vehicle position and a target location, shown as target location 612. Environment 600 illustrates various types of terrain 602, 604.

Referring to the exemplary embodiment shown in FIG. 7, an acoustic cost map, shown as acoustic cost map 700, is illustrated that corresponds to environment 600. Each unit of acoustic cost map 700 is shown including text (e.g., a score) indicating acoustic cost information for the unit. For example, a terrain unit 702 has an acoustic cost of 1 and a terrain unit 704 has an acoustic cost of 10. Acoustic cost map 700 further illustrates a plurality of possible routes 710, 712, 714, 716 that may be determined by vision system 104. Referring to FIG. 8, environment 800 is shown illustrating a preferred path (i.e. stealth path), shown as route 710. Environment 800 may be displayed to an operator of the vehicle (e.g., to provide a less cluttered display). While various embodiments are illustrated in FIGS. 2-8, it should be understood that the method of displaying routes and acoustic data may vary. Further, the information as displayed in FIGS. 2-8 may be only used internally by a vision system.

Figure 9:
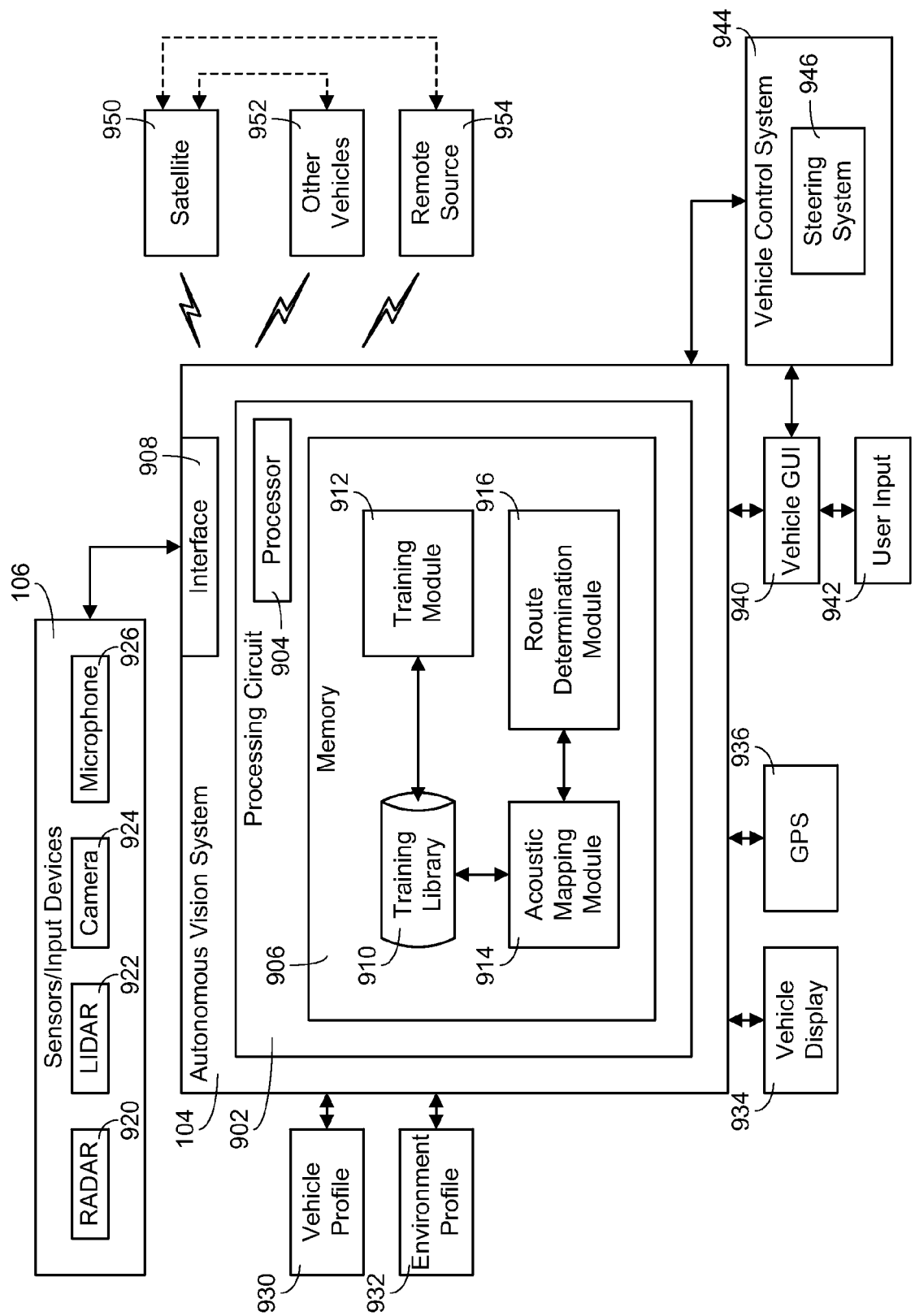
FIG. 9 is a block diagram of a vision system and incorporated vehicle systems, according to an exemplary embodiment.

Referring now to FIG. 9, a block diagram of vision system 104 is shown, according to an exemplary embodiment. Vision system 104 may be configured to use a training library and a sensor input to generate an acoustic map and determine a route, as described with reference to FIGS. 2-8. As shown in FIG. 9, vision system 104 includes a processing circuit 902 having a processor 904 and memory 906. Processor 904 may include one or more microprocessors, application specific integrated circuits (ASICs), circuits containing one or more processing components, circuitry for supporting a microprocessor, or other hardware configured for processing. In some embodiments, processor 904 is configured to execute computer code stored in memory 906 to facilitate the activities described herein. Memory 906 may be any volatile or non-volatile computer-readable storage medium capable of storing data or computer code relating to the activities described herein. For example, memory 906 is shown to include modules 912, 914, 916 having computer code modules (e.g., executable code, object code, source code, script code, machine code, etc.) configured for execution by processor 904. In some embodiments, processing circuit 902 may represent a collection of processing devices (e.g., servers, data centers, etc.). In such cases, processor 904 represents the collective processors of the devices and memory 906 represents the collective storage devices of the devices. When executed by processor 904, processing circuit 902 is configured to complete the activities described herein.

As shown in FIG. 9, vision system 104 includes an interface, shown as interface 908. Interface 908 may include hardware to receive data from a network or serial bus and to communicate data to another processing circuit via a network or serial bus. Interface 908 may be configured to receive or transmit data wirelessly or over a hard-wired connection.

Referring still to the exemplary embodiment shown in FIG. 9, memory 906 includes various modules 912, 914, 916 for completing the activities described herein and a training library 910. Training library 910 may include acoustic data as described with reference to FIGS. 3A-B. Acoustic data may be stored in training library 910 for various types of surfaces (e.g., sand, gravel, cement, asphalt, etc.) or surfaces in which small objects (e.g., leaves, twigs, brush, grass, rocks, etc.) are part of the surface. The acoustic data for each type of surface or terrain stored in the training library may include a decibel level (e.g., a noise level associated with traveling over the surface or terrain), a score or other numeric representation of a sound level, a description of the surface or terrain, a detection risk associated with the surface or terrain, a difficulty of navigation related to the surface or terrain, an acoustic signature, and other information.

According to an exemplary embodiment, the acoustic data varies based on the type of vehicle that may travel over the surface. Therefore, training library 910 may further include multiple sets of acoustic data for each type of surface based on the type of vehicle that may traverse over the surface. In another embodiment, the acoustic data for each surface may also vary based on outside conditions (e.g., weather), and training library 910 may include multiple sets of acoustic data depending on the outside conditions.

According to an exemplary embodiment, training library 910 includes different sets of data for different vehicle conditions (e.g., the speed of the vehicle, the type of vehicle, the wheelbase of the vehicle, the gross vehicle weight, the tire size, whether the vehicle is wheeled or tracked, etc.) and different operating conditions (e.g., the weather conditions of the surrounding environment, the terrain characteristics of the surrounding environment, etc.). Processor 904 may evaluate (i.e. receive data from, retrieve data from, utilize data from, manipulate, scan, etc.) training library 910 to determine the expected acoustic signature that corresponds to the surrounding terrain for the particular vehicle conditions and operating conditions. According to an alternative embodiment, training library 910 includes a universal set of data. Processor 904 may evaluate library 910 to determine the expected acoustic signature that corresponds to the surrounding terrain for the particular vehicle conditions and operating conditions. According to an exemplary embodiment, processor 904 computes an expected acoustic signature with a base value from library 910 and parameters associated with vehicle conditions and operating conditions. By way of example, processor 904 may calculate an expected acoustic signature of 45 dB by multiplying a base value of 50 dB for the surrounding terrain by a factor of 1.5 for a large vehicle speed (e.g., 50 miles per hour) and a factor of 0.6 because the vehicle is wheeled rather than tracked.

As shown in FIG. 9, memory 906 includes a training module 912 coupled to training library 910. Training module 912 may be configured to manage acoustic data stored in training library 910. Training module 912 may use sensor data (e.g., from sensors 920, 922, 924) and microphone data (e.g., from microphone 926) to populate or edit acoustic data stored in training module 912. For example, if a vehicle travels over a particular surface identified using sensor input, training module 912 may receive a sensor input and a microphone input corresponding to the sound the vehicle made when traveling over the surface. Training module 912 may then associate a decibel level and other acoustic data (e.g., an acoustic signature) with the surface and store the information in training library 910. Further, if acoustic data for the surface is already stored in training library 910, training module 912 may determine whether to overwrite the acoustic data with new acoustic data, to combine the acoustic data, or engage in still another action.

According to an exemplary embodiment, the acoustic data stored within training library 910 corresponds to a total noise generated by the vehicle as it maneuvers over terrain (e.g., including engine noise). According to an alternative embodiment, training module 912 includes noise cancelling for sounds not associated with the vehicle's interaction with the surrounding terrain (i.e. other sources). Noise cancelling may electronically remove sounds associated with other sources (i.e. associated sounds) or may introduce a sound wave designed to acoustically cancel the associated sounds (e.g., with a wave that is acoustically out of phase with waves from the associated sound, etc.). According to an exemplary embodiment, sounds of a particular source (e.g., an engine, etc.) are recorded to produce the associated sound. According to an alternative embodiment, the associated sound is generated based on a model of the source (e.g., an engine noise model correlated to engine RPM).

In one embodiment, vision system 104 may not include a training module 912, and the vehicle may not include or be coupled to a microphone 926. Such a vision system may not include the ability to measure a decibel level or other acoustic data as the vehicle is traveling. According to an exemplary embodiment, training library 910 may then include pre-existing acoustic data and may be used by vision system 104 without being updated in real-time.

Referring again to the exemplary embodiment shown in FIG. 9, memory 906 includes an acoustic mapping module, shown as acoustic mapping module 914. Acoustic mapping module 914 may be configured to generate an acoustic cost map using acoustic data from training library 910 and data from sensors 106. For example, after receiving sensor data, acoustic mapping module 914 may analyze the data to classify the terrain around the vehicle. Acoustic mapping module 914 may then use the acoustic data from training library 910 to create an acoustic signature for various portions (e.g., terrain units) of the terrain. An acoustic signature may be an expected acoustic signature, which represents acoustic properties, related to the terrain that an operator of the vehicle may or should expect when the vehicle travels over the surface. The acoustic signatures may be used to generate an acoustic cost map (e.g., as shown in FIGS. 4A-B). Acoustic mapping module 914 is described in greater detail in FIG. 10B.

As shown in FIG. 9, memory 906 includes a route determination module 916. Using the acoustic map generated by acoustic mapping module 914, route determination module 916 may generate a potential route for the vehicle. The route may be a route that minimizes noise output of the vehicle, according to an exemplary embodiment. The process of route generation and selection is described in greater detail in FIG. 10C.

According to an exemplary embodiment, vision system 104 may be coupled to various sensors 106 via interface 908. For example, RADAR 920 may be configured to scan surrounding terrain (e.g., terrain units or areas of the terrain that are relevant to vehicle operation, such as terrain in the vehicle's path) using radio waves. According to an alternative embodiment, LIDAR 922 may be configured to scan surrounding terrain using optical remote sensing technology. In still other embodiments, a camera 924 may be configured to capture images of the surrounding terrain. The images may be compared by acoustic mapping module 914 to training library 910 to determine terrain types or may be used by training module 912 to update information in training library 910. According to an alternative embodiment, microphone 926 may be configured to sense a sound level as the vehicle is traversing the terrain. The microphone signal may then be used as an observed acoustic signature by training module 912, as described above.

Vision system 104 is shown coupled to vehicle profile 930 and environment profile 932. Vehicle profile 930 may include vehicle information that may impact an acoustic profile of the vehicle. Vision system 104 may use vehicle profile 930 information as part of the route determination process. Vehicle profile 930 may include the type of vehicle and intended mode or operation of the vehicle. For example, the vehicle may be a heavy-duty military vehicle intended for operation in conflict. Vehicle profile 930 may include further information such as a mission planner or objective related to the vehicle (e.g., a stealth mission in which vehicle detection is not desired). Vehicle profile 930 may also indicate passenger information in the vehicle (if the vehicle is manned).

In one embodiment, vehicle profile 930 may include or may be coupled to a diagnostic system or other vehicle system that tracks vehicle performance and other properties. For example, tire inflation may impact a vehicle's noise level when the vehicle is traversing over a particular surface. Therefore, vehicle profile 930 may include a tire inflation level for each tire. Vision system 104 may then include the tire inflation level as part of the route determination process. As another example, vehicle suspension information may be included in vehicle profile 930. Such information may be used by vision system 104 to determine whether to route the vehicle over certain (e.g., hilly, bumpy) terrain.

Environment profile 932 may include information related to the environment surrounding the vehicle. For example, environment profile 932 may include current and future weather conditions that may impact vehicle performance (e.g., precipitation, temperature, humidity, wind, etc.). Vision system 104 may include environment profile 932 information to determine potential hazardous situations that may increase the noise level of the vehicle. Environment profile 932 may further include general information such as general geographical information, typical terrain conditions for the area, and other data.

Vision system 104 may be coupled to a vehicle display 934. Vehicle display 934 may be a display within the vehicle configured to provide an occupant of the vehicle (if the vehicle is manned) with information, or may be a display located remotely from the vehicle for a remotely located operator. Vehicle display 934 may be configured to display an acoustic cost map, a determined route from route determination module 916, or any other information from vision system 104. In one embodiment, vision system 104 may determine a stealth path for the vehicle and display the stealth path to the operator via vehicle display 934. Vehicle display 934 may be any type of display. In one embodiment, vehicle display 934 may be a driver aid (e.g., an overlay on an LCD screen map) that shows route information (e.g., a current location and direction of traversal of the vehicle), acoustic information, and other information.

In some embodiments, vision system 104 may be coupled to a global positioning system (GPS) 936 or other navigation system. In one embodiment, vision system 104 may be incorporated with the activities of GPS 936. For example, if the vehicle is manned, vision system 104 may determine a route for the vehicle. The route may be provided to GPS 936, and GPS 936 functionality in concert with vision system 104 functionality may be used to provide an operator of the vehicle with route information.

Vision system 104 may be coupled to a vehicle graphical user interface (vehicle GUI) 940, according to an alternative embodiment. Vehicle GUI 940 may be configured to receive a user input 942 related to vehicle functionality. Vehicle GUI 940 may be any type of user interface. For example, vehicle GUI 940 may include an LCD configured to display an acoustic cost map, route, or other acoustic information may include one or more pushbuttons, knobs, or other input devices, may include a touchscreen, etc. User input 942 may be a user input related to vehicle functionality. For example, if the vehicle is a manned vehicle but has autonomous functionality, a user input 942 may be provided via vehicle GUI 940 indicating a preferred change in vehicle operation (e.g., a change in the route, a change in acoustic settings of vision system 104, etc.). As another example, a user input 942 may be provided that approves or rejects a route or stealth path selected by vision system 104. Vehicle GUI 940 may also be coupled to a vehicle control system 944 that allows the operator to control vehicle operation while bypassing vision system 104.

Vision system 104 may be coupled to vehicle control system 944, which may control general vehicle operation. In one embodiment, vehicle control system 944 is an autonomous or semi-autonomous vehicle control system. Vision system 104 may provide vehicle control system 944 with route information and other vehicle profile information. In some embodiments, vehicle control system 944 pilots the vehicle along the determined route using steering system 946. Further, vision system 104 may determine desired characteristics (e.g., a desired tire inflation level or suspension adjustment) associated with vehicle profile 930. Vehicle control system 944 is configured to receive such characteristics and to adjust the vehicle's various settings (e.g., by pre-emptively adjusting the vehicle suspension if a bump is upcoming in the route, by reducing tire pressure to reduce an acoustic signature over a particular surface, etc.).

In some embodiments, vision system 104 communicates with remote sources. For example, vision system 104 may communicate with a satellite 950 for various purposes. In one embodiment, satellite 950 may detect the vehicle location and provide terrain information based on the vehicle location. For example, satellite 950 or an aerial scanner or imager may locate the vehicle and provide images and analysis of the surrounding area. Such information may be used instead of or in addition to sensor 106 data. In another embodiment, satellite 950 may facilitate communications with other vehicles 952 or remote sources 954. In yet another embodiment, satellite 950 may include or be connected to a training library or other acoustic data that may be used by vision system 104, as described above. Vision system 104 may further be capable of communication with other vehicles 952 directly (e.g., via radio).

In one embodiment, after determining a route, vision system 104 may be configured to send at least one of route and acoustic data to other vehicles 952. For example, vision system 104 may be configured to send a route to another vehicle. As another example, vision system 104 may be configured to send observed acoustic characteristics to another vehicle, and that vehicle may then calculate a route using the received acoustic data. In another embodiment, after determining a route, vision system 104 is configured to send the route and related acoustic data to a remote source 954 in possession of a user who may be planning to walk the route or otherwise traverse the route.

In one embodiment, vision system 104 is used along with other vehicles 952 in a leader and follower scenario. Vision system 104 is associated with a leader vehicle that communicates with a plurality of other vehicles 952. The leader vehicle with vision system 104 traverses along a route and actively takes sensor data. The sensor data is sent to other vehicles 952 or remote source 954. The other vehicles or the remote source use the sensor data to independently develop a stealth path. The sensor data, when sent, may be tagged with information such as the date, time, weather conditions, location, or other information associated with the sensor data. According to an exemplary embodiment, a remote source may accept the sensor data as primary data values and modify a training library (e.g., a master training library) based on the sensor data or store the sensor data as secondary data values (e.g., data values for use where conditions are similar to those experienced by the vehicle as shown in the tags).

Figure 10A:
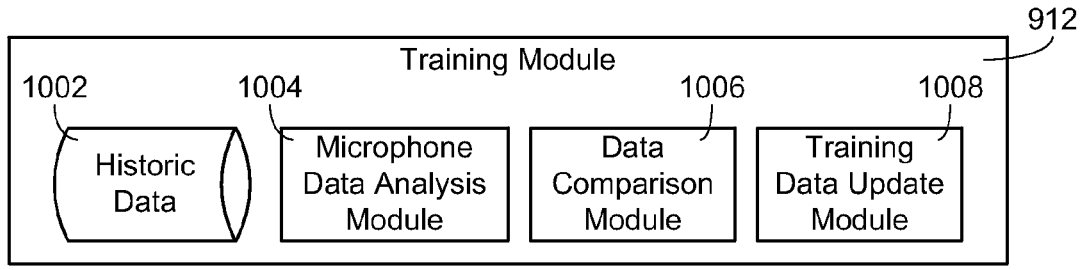
FIGS. 10A-C are more detailed block diagrams of the training, acoustic mapping, and route determination modules of the vision system of FIG. 9, according to an exemplary embodiment.

Referring to FIG. 10A, training module 912 is shown in greater detail. Training module 912 is configured to manage acoustic data stored in training library 910. Training module 912 uses sensor data (e.g., from sensors 920, 922, 924) and microphone data (e.g., from microphone 926) to populate or edit acoustic data stored in training module 912. In one embodiment, a vision system may not include a microphone, autonomous training module 912, or any other module configured to update acoustic data stored in training library 910 based on observed acoustic data.

Training module 912 is shown in FIG. 10A to include a microphone data analysis module 1004. Microphone data analysis module 1004 receives microphone data from microphone 926 and interprets the microphone data to determine an observed acoustic signature (e.g., observed acoustic characteristics). The observed acoustic signature may be acoustic data for a given terrain unit in the environment. The observed acoustic signature may include a decibel level or other acoustic signature associated with the vehicle traveling over the terrain unit and other acoustic data relating to the terrain unit.

As shown in FIG. 10A, training module 912 includes a data comparison module 1006. Data comparison module 1006 compares the observed acoustic signature for a terrain unit with historical data 1002 and acoustic data in training library 910. In one embodiment, data comparison module 1006 determines or calculates an acoustic difference in an observed acoustic signature for a terrain unit and the expected acoustic signature of the terrain unit as stored in the training library. In another embodiment, data comparison module 1006 determines a difference in an observed acoustic signature for a terrain unit and historical data for the terrain unit or a similar terrain unit.

Referring still to the exemplary embodiment shown in FIG. 10A, historical data 1002 includes previous observed acoustic signature information from previous microphone inputs. For example, historical data 1002 may include previous microphone inputs, historical data relating to previous movement and acoustic noise levels of the vehicle, or other previously acquired data.

According to an exemplary embodiment, training module 912 includes training data update module 1008. Using data from data comparison module 1006, training data update module 1008 may update training library with the new data related to the observed acoustic signature and its difference with acoustic data already stored in training library 910. For example, if data comparison module 1006 determines a difference between the observed and expected acoustic signature for a particular terrain unit, training data update module 1008 may be configured to overwrite the acoustic data stored in training library 910 with the new observed acoustic signature. As another example, training data update module 1008 may be configured to aggregate or average in the observed acoustic signature with acoustic data already stored in training library 910. Therefore, the new acoustic data may be incorporated into the vision system process but the previous acoustic data may be preserved. Training data update module 1008 may further include any other activity related to training library 910 maintenance.

In some embodiments, training data update module 1008 is configured to provide the observed acoustic signature and other acoustic data to remote sources. For example, a training library located remotely from the vehicle may be updated using the observed acoustic signature for a particular terrain unit. In one embodiment, the activities of training data update module 1008 include the tagging of the observed acoustic signature or other acoustic data. A tag associated with the acoustic data may indicate information relevant to the acoustic data. For example, a timestamp of when the acoustic signature was observed, weather conditions or other environmental conditions, a current status of the vehicle, and other circumstantial information may be "tagged" with the observed acoustic signature. The tag may be stored in training library 910 alongside the observed acoustic signature, may be provided to a remote source alongside the observed acoustic signature, or may otherwise be associated with the acoustic data such that the information may be used by acoustic mapping module 914 or route determination module 916 as part of their activities.

As described above, training module 912 may be configured to update training library 910 as a vehicle traverses an environment. Training library 910 may be populated with acoustic data solely based on input from training module 912, according to an exemplary embodiment. In another embodiment, training library 910 includes acoustic data pre-stored before vehicle operation (e.g., training library 910 data may be established at a manufacturing step before the vision system is operable, training library 910 may be populated with user inputted data before vehicle operation, etc.) along with acoustic data determined during vehicle operation.

In one embodiment, if data in training library 910 is updated, training module 912 is configured to receive a new microphone input (e.g., another observed acoustic signature) and compare the observed acoustic signature to the data in training library 910. This process is repeated until the observed acoustic signature for a particular terrain unit corresponds (e.g., within two dB, etc.) with the expected acoustic signature for the particular terrain unit stored in training library 910.

Figure 10B:
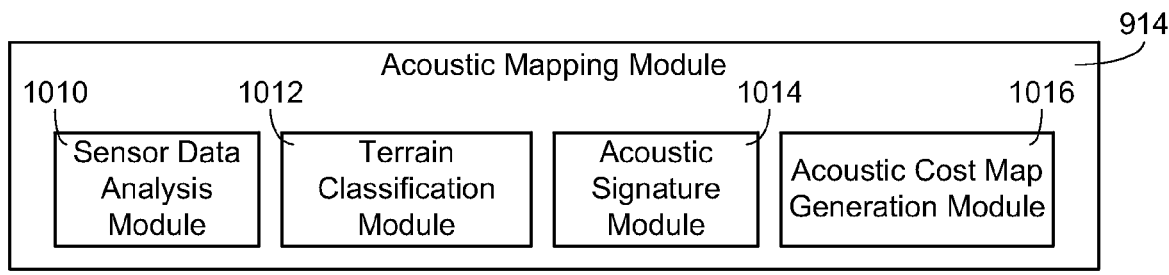

Referring next to the exemplary embodiment shown in FIG. 10B, acoustic mapping module 914 is configured to use acoustic data and generate an acoustic cost map. As shown in FIG. 10B, acoustic mapping module 914 includes a sensor data analysis module 1010. Sensor data analysis module 1010 receives and analyzes a sensor input. Sensor data analysis module 1010 is configured to analyze inputs from various types of sensors. For example, sensor data analysis module 1010 may receive one or more images captured from a camera device and analyze the image for terrain properties.

As shown in FIG. 10B, acoustic mapping module 914 further includes a terrain classification module 1012. Terrain classification module 1012 is configured to classify terrain based on the analysis of the sensor data. In one embodiment, sensor data analysis module 1010 analyzes sensor data relating to a particular terrain unit of the terrain, and terrain classification module 1012 classifies the particular terrain unit as a type of terrain (e.g., sand, asphalt, gravel, etc.) or a combination of different types of terrain based on the sensor data.

Acoustic mapping module 914 may further include an acoustic signature module 1014. After terrain classification, acoustic signature module 1014 may be configured to generate an acoustic signature based on the terrain classification of each terrain unit. For example, acoustic signature module 1014 may use acoustic data stored in training library 910 to determine an acoustic signature for a terrain unit. The acoustic signature may represent expected acoustic characteristics when the vehicle traverses across the terrain unit.

Acoustic mapping module 914 may further include an acoustic cost map generation module 1016 configured to generate an acoustic cost map based on the acoustic signatures. Exemplary acoustic cost maps are illustrated in FIGS. 4A-B and FIG. 7. For each terrain unit, the acoustic cost map may display acoustic information such as a score related to a noise level, the decibel level, the terrain type, the acoustic signature, or other information. Further, each terrain unit may be associated with a color, shade, or differing transparencies on the acoustic cost map.

In one embodiment, each terrain unit in the acoustic cost map includes a single type of terrain and a corresponding acoustic signature. In another embodiment, each terrain unit includes more than one type of terrain. In such a situation, various methods may be used to classify the terrain unit. For example, if the terrain unit includes two different types of terrain and one type has a higher decibel level or score than the other (e.g., 4 points for asphalt compared to 1 point for sand), then the higher score and corresponding acoustic signature may be chosen for the acoustic cost map. According to an alternative embodiment, the lower score and corresponding acoustic signature may be chosen. In other embodiments, the vision system may determine which type of terrain is more dominant within the terrain unit, and a corresponding score and acoustic signature may be chosen. As yet another example, the score and acoustic signature for each type of terrain may be aggregated or averaged together for the acoustic cost map.

Figure 10C:
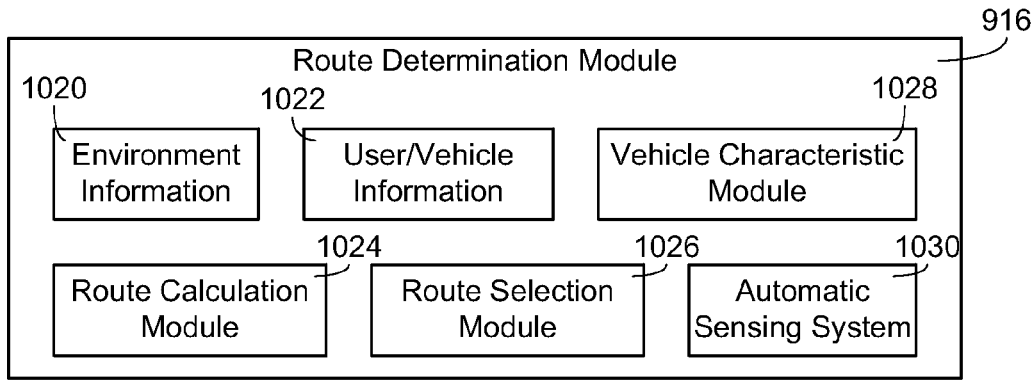

Referring to FIG. 10C, route determination module 916 is shown in greater detail, according to an exemplary embodiment. Route determination module 916 is configured to use an acoustic cost map and other acoustic data to determine a route for a vehicle. Route determination module 916 is shown to include environment information 1020. Environment information 1020 may be received from an environment profile 932. Further, route determination module 916 is shown to include user and vehicle information 1022. User information may be received from a user input 942 or may be stored in vision system 104, and vehicle information may be received from a vehicle profile 930.

Route determination module 916 may further include a route calculation module 1024. Route calculation module 1024 is configured to determine possible routes based on the acoustic cost map and other acoustic data. For example, referring also to FIG. 7, route calculation module 1024 may be configured to generate possible routes 710, 712, 714, 716 for evaluation by route determination module 916.

In one embodiment, route calculation may include using information other than acoustic data. Such information may include information received from a satellite or other outside source. For example, if a satellite indicates positions of hostiles close to the vehicle, route calculation module 1024 may be configured to create routes that avoid the hostiles. As another example, other vehicle positions may be received, and routes may be created that avoid collisions with the other vehicles. As yet another example, if the vehicle is attempting to traverse over a minefield, possible mine locations may be avoided in route creation. In still another example, route calculation may favor creating routes that include known roads or pre-existing paths.

As shown in FIG. 10C, route determination module 916 includes route selection module 1026. Route selection module 1026 may select a route from the plurality of routes generated by route calculation module 1024. Route selection module 1026 may first calculate an acoustic cost for each route, and the route selection may occur based on the acoustic cost of each route. For example, the calculation of the acoustic cost may be an addition of all scores for each terrain unit in which the route occupies. Route selection module 1026 may then select the route with the lowest acoustic cost, or may select a route by considering the acoustic cost of each route in addition to other acoustic information, vehicle operation, or other strategy. For example, referring also to FIG. 5, route 506 with the lowest acoustic cost (i.e. the stealth path) is shown selected by route selection module 1026.

Route selection module 1026 may use environment information 1020 and user and vehicle information 1022 as part of the route selection process. For example, the acoustic cost of a route may be adjusted based on environment information (e.g., if there is bad weather, the noise level of the vehicle may be impacted if the vehicle attempts to drive through a muddy area). As another example, current vehicle characteristics may be used to adjust the acoustic cost (e.g., the vehicle's suspension system or tire inflation level may impact the noise level of the vehicle). As yet another example, an elevation change over an area of terrain may be used to adjust an acoustic cost of a route.

Route determination module 916 further includes vehicle characteristic module 1028. After selection of a route, route determination module 916 may determine desired vehicle settings (e.g., tire inflation, suspension adjustment, etc.). These desired vehicle settings may impact the noise level of the vehicle. Vehicle characteristic module 1028 determines the desired vehicle settings and sends a change signal to vehicle information 1022 to indicate revised vehicle settings. In one embodiment, route selection module 1026 and vehicle characteristic module 1028 work in concert, allowing route selection module 1026 to select a route at least partially based on a change in vehicle settings. Vehicle characteristic module 1028 provides an output to vehicle control system 944, according to one embodiment.

Route determination module 916 further includes an automatic sensing system 1030. Automatic sensing system 1030 receives a sensor input and automatically determines whether an obstacle is detected via the sensor input. If an obstacle is detected, a determined route may be adjusted by the vision system. For example, a hostile or other mobile object may be detected, and the route may need to be adjusted as a result. As another example, an object that may alter an expected noise output of the vehicle (e.g., brush, stick, etc.) may be detected, and the route may need to be adjusted to avoid the object. Any of the modules 1024, 1026, 1028 may receive an indication of an obstacle or other change in condition from automatic sensing system 1030 and use the information in the route generation and selection process. Further, if an obstacle was previously detected, automatic sensing system 1030 may determine when the obstacle is no longer present and provide an indication to modules 1024, 1026, 1028 that "normal" operation may resume. Automatic sensing system 1030 operation is described in greater detail in FIG. 17.

Referring next to FIGS. 11-17, flow charts illustrating various vision system operations are shown, according to exemplary embodiments. It should be understood that the operation of the vision system is not limited to the activities described in the processes below, and that variations within the processes below may be possible.

Figure 11:
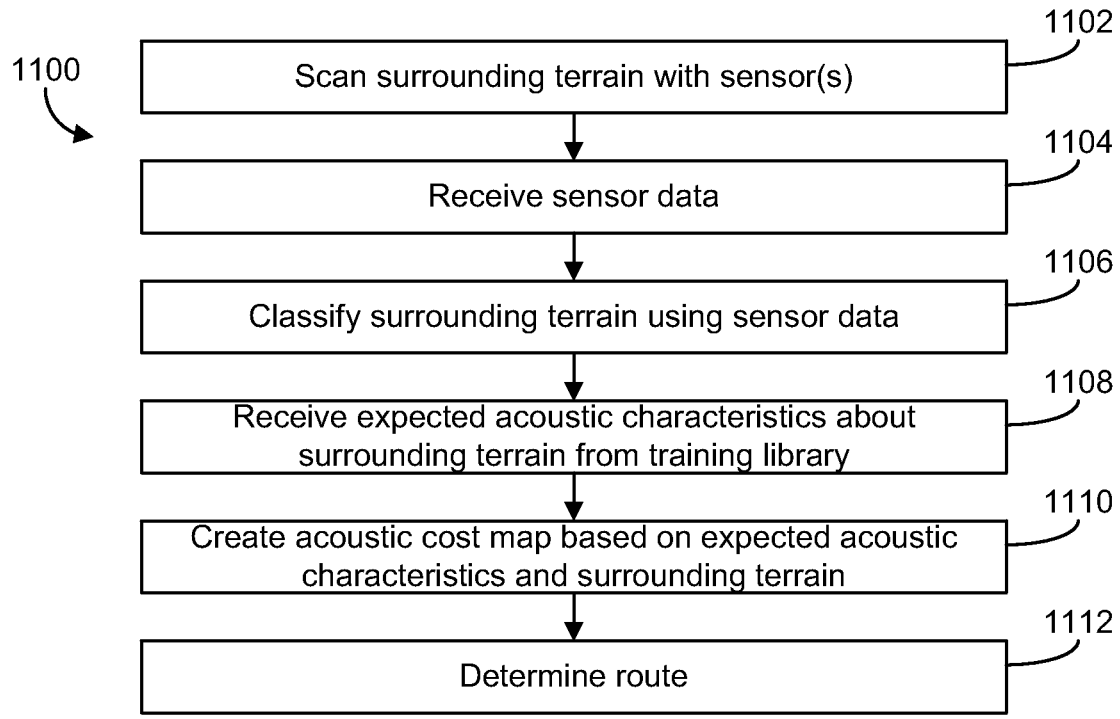
FIG. 11 is a flow chart of a route determination process of the vision system, according to an exemplary embodiment.

Referring first to FIG. 11, a flow chart of a route determination process 1100 of the vision system is shown, according to an exemplary embodiment. Route determination process 1100 may be initiated based on varying factors. In one embodiment, route determination process 1100 may be initiated automatically when a vehicle approaches an area. In another embodiment, route determination process 1100 may be initiated when a request for a vehicle route is received by the vision system. The request for the route may include the starting location (which may be the current vehicle location or a different location) and a target location (e.g., a destination).

Route determination process 1100 includes scanning the surrounding terrain with one or more sensors (step 1102) and receiving the sensor data at the vision system (step 1104). The sensor data at step 1104 may be provided to, for example, a sensor data analysis module 1010. Route determination process 1100 further includes classifying the surrounding terrain using the sensor data (step 1106). Step 1106 may be performed by, for example, terrain classification module 1012 as described above.

Route determination process 1100 further includes receiving expected acoustic characteristics about the surrounding terrain from the training library (step 1108). The expected acoustic characteristics may relate to the acoustic events the vehicle may or should expect to experience when the vehicle travels over the surface. Route determination process 1100 further includes creating an acoustic cost map based on the expected acoustic characteristics and the surrounding terrain (step 1110). Route determination process 1100 further includes determining a route based on the acoustic cost map (step 1112).

Figure 12:
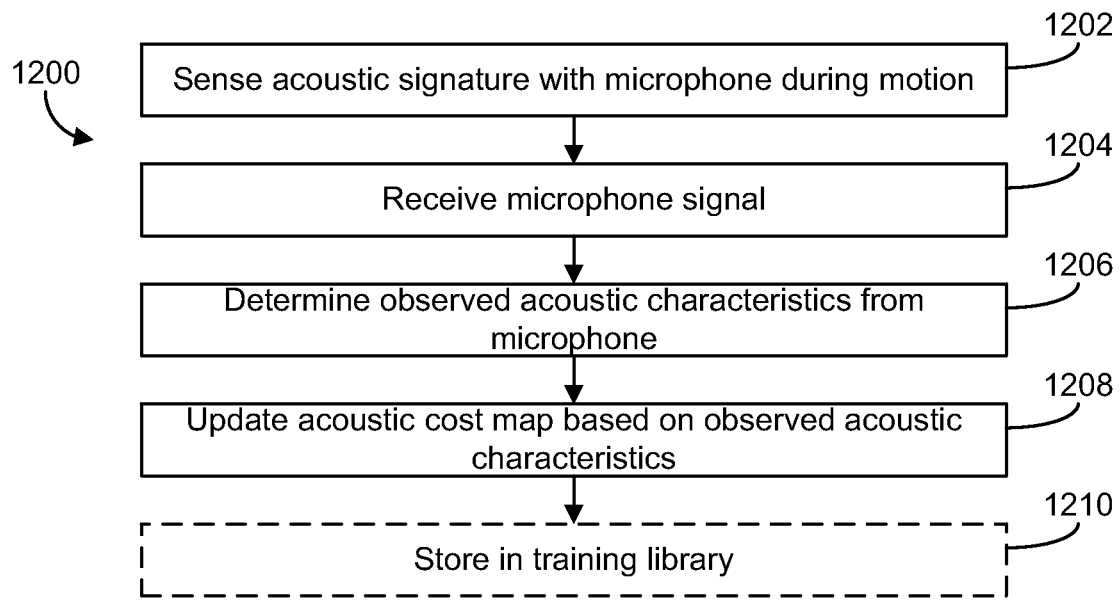
FIG. 12 is a flow chart of a process for using microphone signals to determine an acoustic cost of vehicle operation, according to an exemplary embodiment.

Referring to FIG. 12, a flow chart of a process 1200 for using microphone signals to determine an acoustic cost of vehicle operation is shown, according to an exemplary embodiment. Process 1200 may be executed by, for example, training module 912 or another module configured to update a training library.

As shown in FIG. 12, process 1200 includes sensing the acoustic signature with a microphone or other audio input device during motion (step 1202). Process 1200 further includes receiving the microphone signal (step 1204) and determining observed acoustic characteristics from the microphone signal (step 1206). The observed acoustic characteristics may be acoustic data observed by the microphone. Step 1206 may be performed by, for example, microphone data analysis module 1004 as described above.

Process 1200 may further include updating (or creating) an acoustic cost map based on the observed acoustic characteristics (step 1208). In other words, an acoustic cost map is updated or created based on actual observed acoustic data. Process 1200 may further include storing the observed acoustic characteristics in a training library (step 1210). Step 1210 may occur where the training library should be updated based on new or changed information. Step 1210 may be executed by, for example, training data update module 1008.

Figure 13:
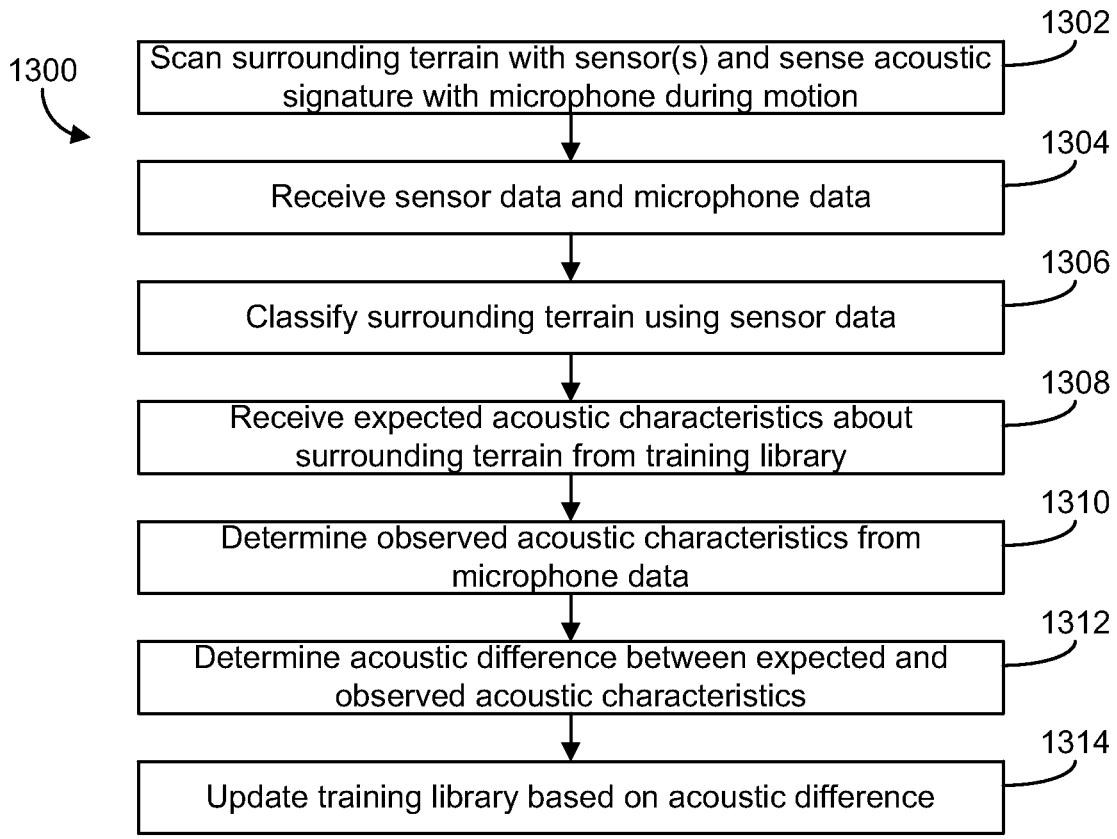
FIG. 13 is a flow chart of a process for using sensor and microphone signals to determine acoustic data for the vision system, according to an exemplary embodiment.

Referring next to FIG. 13, a flow chart of a process 1300 for using sensor and microphone signals to determine acoustic data for the vision system is shown, according to an exemplary embodiment. Process 1300 may use the sensor and microphone inputs to determine differences between expected and observed acoustic data and may use the differences to update a training library. Process 1300 may be used to improve the performance of the vision system. Process 1300 may be executed by, for example, training module 912.

As shown in FIG. 13, process 1300 includes scanning surrounding terrain with one or more sensors and sensing the acoustic signature with the microphone during motion (step 1302) and receiving the sensor data and microphone data (step 1304). Process 1300 further includes classifying the surrounding terrain using the sensor data (step 1306) and receiving expected acoustic characteristics about the surrounding terrain from the training library (step 1308). Process 1300 further includes determining observed acoustic characteristics from the microphone data (step 1310).

According to an exemplary embodiment, process 1300 further includes determining an acoustic difference between the expected and observed acoustic characteristics (step 1312). A difference between the acoustic characteristics may represent a difference between an expected noise level (and other acoustic data) and the actual noise level of the vehicle as the vehicle maneuvers along the terrain. Such a difference may represent a margin of error for the vision system. If the vehicle is moving during the execution of process 1300, step 1312 may include factoring in the change in vehicle position when determining the acoustic difference.

Process 1300 may further include updating the training library based on the acoustic difference (step 1314). In one embodiment, step 1314 may include, if the acoustic difference is greater than zero or greater than a threshold (e.g. 5 dB, 10 dB, etc.), overwriting data in the training library for a particular type of terrain. For example, the expected acoustic characteristics stored in the terrain library may be overwritten with the observed acoustic characteristics from the microphone data. In another embodiment, step 1314 may include aggregating or averaging the observed acoustic characteristics with the expected acoustic characteristics for a particular type of terrain. In yet another embodiment, step 1314 may include, if the terrain library is located remotely from the vehicle, transmitting an output signal including the observed acoustic characteristic if the acoustic difference is greater than zero. In such a case, the output signal may include tagging information that provides further information about the observed acoustic characteristics.

Figure 14:
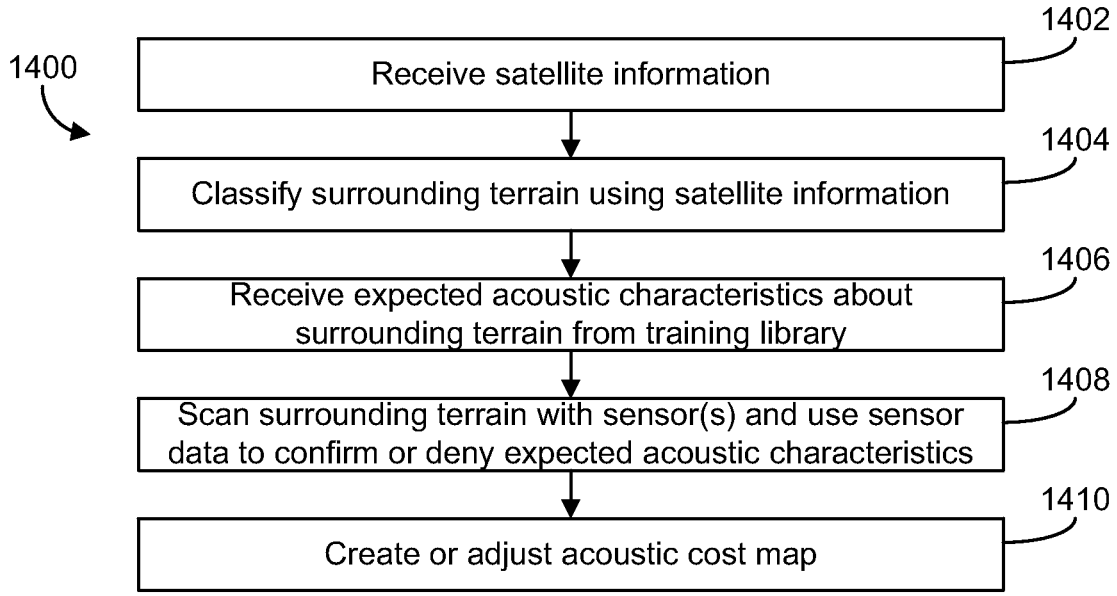
FIG. 14 is a flow chart of a process for using satellite information with sensor information in the vision system, according to an exemplary embodiment.

Referring next to FIG. 14, a flow chart of a process 1400 for using satellite information with sensor information in the vision system is shown, according to an exemplary embodiment. Process 1400 may be configured to allow the vision system of the present disclosure to use satellite information (or other remote information) in the acoustic data determination process. Process 1400 may be executed by, for example, acoustic mapping module 914.

Process 1400 may include receiving satellite information (step 1402). For example, a satellite, aerial scanner, imager, or other remote object may provide the vehicle and vision system with images and analysis of the surrounding terrain. As another example, satellite information may include training library information located remotely from the vehicle. Process 1400 further includes classifying surrounding terrain using the satellite information (step 1404) and receiving expected acoustic characteristics about the surrounding terrain from the terrain library (step 1406). Steps 1404, 1406 may include the steps of analyzing the satellite information in the same fashion as sensor data may be analyzed by the vision system. In one embodiment, expected acoustic characteristics may be received from the satellite and step 1406 may be omitted.

According to an exemplary embodiment, process 1400 further includes scanning surrounding terrain with one or more sensors and using the sensor data to confirm or deny the expected acoustic characteristics (step 1408). In other words, after scanning using the sensors and analyzing the sensor data, the expected acoustic characteristics determined using the sensor data may be compared to the expected acoustic characteristics determined using the satellite information. In one embodiment, the expected acoustic characteristics determined using the satellite information may be confirmed by the sensor data. According to an exemplary embodiment, historical satellite information (e.g., year-old hyperspectral imagery) is utilized to generate the expected acoustic characteristics. By way of example, process 1400 may include analyzing the historical satellite information to generate a base value that may be confirmed or modified based on the sensor data. In another embodiment, the expected acoustic characteristics determined using the satellite information may be different, and step 1408 may include relaying such information to the satellite or other remote source.

As shown in FIG. 14, process 1400 further includes creating or adjusting an acoustic cost map based on the expected acoustic characteristics (step 1410). For example, if an acoustic cost map was created using satellite information, the acoustic cost map may be adjusted based on the sensor data.

Figure 15:
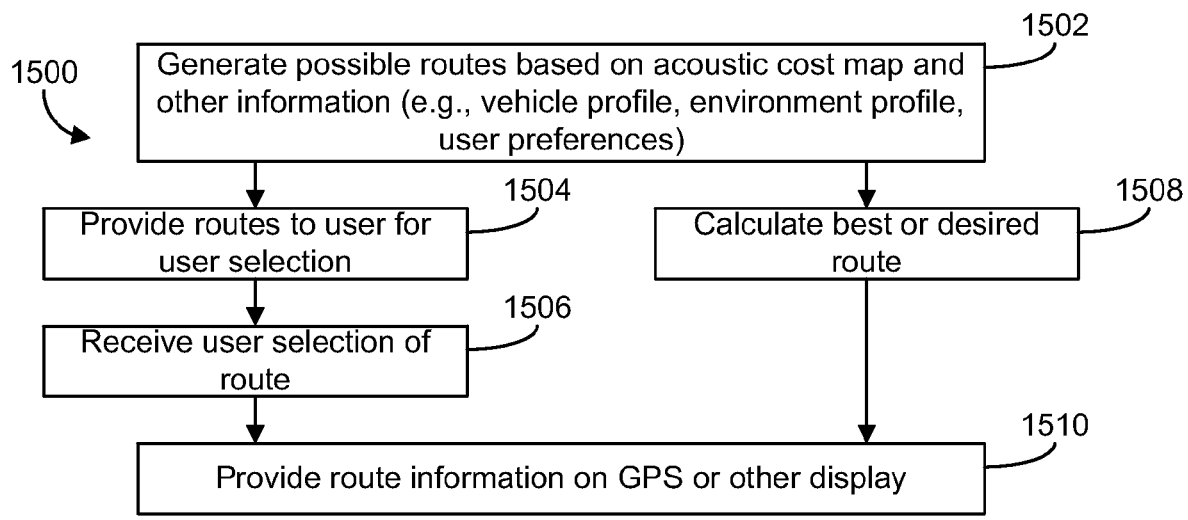
FIG. 15 is a flow chart of a route selection process, according to an exemplary embodiment.

Referring to FIG. 15, a flow chart of a route selection process 1500 is shown, according to an exemplary embodiment. Process 1500 includes generating possible routes based on an acoustic cost map and other information (step 1502) such as a vehicle profile, environment profile, or user preferences. Route generation may occur as described above with reference to route calculation module 1024.

Process 1500 may include either a user selection of a route or an automated selection of a route. In one embodiment, process 1500 includes providing routes to a user for user selection (step 1504) and receiving the user selection of a route (step 1506). For example, step 1504 may include displaying the routes to the user via a vehicle display, GPS, or other display, and the user selection may be received via a vehicle GUI. In another embodiment, process 1500 may include calculating a desired route (i.e. a stealth path) (step 1508). The calculation of the desired route may include the calculation of an acoustic cost for each route and the selection of the route with the lowest acoustic cost. The calculation of the desired route may also consider other factors such as the vehicle profile, environment profile, mission profile, etc. Process 1500 may then include providing route information for the selected route on a GPS or other display (step 1510), or to a vehicle control system for automating vehicle movement.

Figure 16:
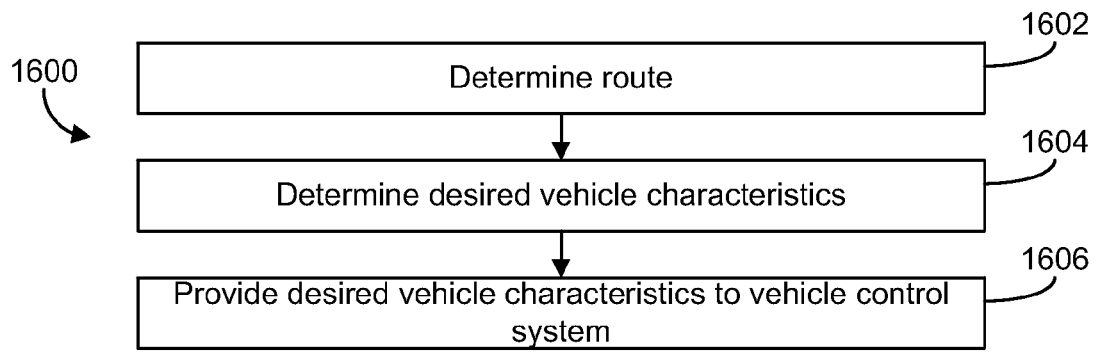
FIG. 16 is a flow chart of a process for controlling vehicle characteristics using the vision system, according to an exemplary embodiment.

Referring next to FIG. 16, a flow chart of a process 1600 for controlling vehicle characteristics using a vision system is shown, according to an exemplary embodiment. Process 1600 may include the determination of a route (step 1602) and desired vehicle characteristics (step 1604). For a determined route, various route properties may be evaluated. For example, route properties may include the types of terrain over the course of the route, any uphill, downhill, or side hill portions of the route, any obstacles or special considerations in the route, etc. The route properties may then be used to determine desired vehicle characteristics. In one example, if a portion of the route goes through a muddy or watery path, it may be desired to change the tire inflation of the tires of the vehicle for that portion of the route. As another example, if a portion of the route goes through very rocky gravel, it may be desired to adjust the vehicle suspension to reduce noise. As yet another example, if a portion of the route goes over an icy area of a road, the desired vehicle speed may be lowered.

Process 1600 may further include providing the desired vehicle characteristics to the vehicle control system (step 1606). The vehicle control system may automatically control at least a portion of the vehicle functionality as specified by the vision system. In another embodiment, the desired vehicle characteristics may be provided to an operator of the vehicle, and the operator may manually adjust the vehicle characteristics, if possible.

Figure 17:
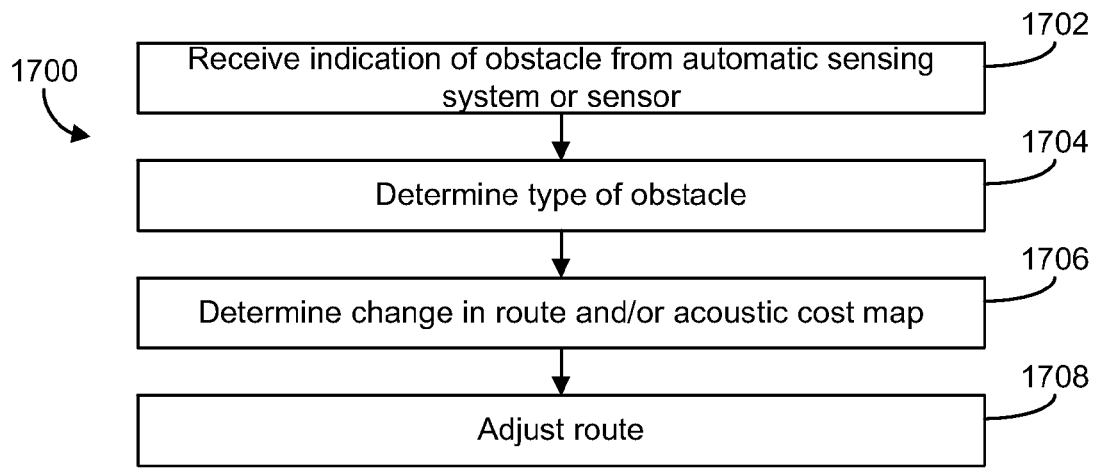
FIG. 17 is a flow chart of an obstacle detection process of the vision system, according to an exemplary embodiment.

Referring next to FIG. 17, a flow chart of a obstacle detection process 1700 of the vision system is shown, according to an exemplary embodiment. Process 1700 may be executed in real-time (i.e. obstacle detection may be performed by the vehicle continuously, and process 1700 may be executed after detection of an obstacle without user input or other input from the vision system). Process 1700 includes receiving an indication of an obstacle from an automatic sensing system (e.g., as shown in FIG. 10C) or other sensor (step 1702).

According to an exemplary embodiment, process 1700 further includes determining a type of obstacle (step 1704). For example, step 1704 may include determining whether the obstacle is moving (e.g., if the obstacle is a hostile or a moving object), if the obstacle is related to the terrain, if the obstacle relates to an unexpected noise (e.g., gunshot), or otherwise. Process 1700 may then include determining a change in the route or the acoustic cost map (step 1706). As one example, if an obstacle is detected and is embedded in the terrain, step 1706 may include recalculating an acoustic cost for the corresponding unit in the acoustic cost map, and then recalculating a best route. As another example, if an obstacle is detected that prevents travel along a route, a new best route may be calculated.

The route may be adjusted in step 1708. According to an alternative embodiment, the vehicle may come to a halt, switch to a silent mode or other mode that may change the acoustic profile of the vehicle, select a new target location, or engage in another activity. In one embodiment, process 1700 may include an optional step of determining that the obstacle is no longer present. In such an embodiment, process 1700 may be configured to return the to the original route.

The system and methods described herein relate to vehicle operation in general. In one embodiment, after determining a route for a vehicle, the route may be provided to users who may plan to traverse the path by foot or by other non-vehicular means. The vision system may be configured to accommodate for such traversal.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data, which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A terrain classification system for a vehicle, comprising:
   a sensor positioned to scan a surrounding terrain, the sensor providing a sensor signal representative of returns from scanning the surrounding terrain; and
   a processing circuit configured to:
   receive the sensor signal;
   classify the surrounding terrain using the sensor signal;
   evaluate a library of acoustic data to determine an expected acoustic signature that corresponds to the classified surrounding terrain; and
   create an acoustic cost map with the expected acoustic signature.

2. The system of claim 1, further comprising an instrument coupled to the sensor, wherein the instrument interacts with the sensor to scan the surrounding environment as a plurality of discrete terrain units and the processing circuit evaluates the library of acoustic data to determine the expected acoustic signature for each of the plurality of discrete terrain units.

3. The system of claim 2, further comprising a microphone, wherein the microphone senses a sound level as the vehicle traverses the terrain unit and outputs an observed acoustic signature.

4. The system of claim 3, wherein the processing circuit is further configured to receive the observed acoustic signature and compare the expected acoustic signature with the observed acoustic signature, the variation between the expected acoustic signature and the observed acoustic signature defining an acoustic difference.

5. The system of claim 4, wherein the processing circuit is configured to send an output signal relating to the observed acoustic signature if the acoustic difference is greater than zero.

6. The system of claim 5, wherein the output signal includes tagging information.

7. The system of claim 1, wherein the processing circuit is further configured to apportion the surrounding terrain into at least two discrete units, classify each of the at least two discrete units, evaluate the library to determine expected acoustic signatures that correspond to the at least two discrete units, and create the acoustic cost map of the at least two expected acoustic signatures.

8. The system of claim 1, wherein the sensor comprises at least one of a LIDAR device, RADAR device, and a camera.

9. A vehicle, comprising:
a chassis;
a sensor coupled to the chassis and positioned to scan a surrounding terrain, the sensor providing a sensor signal representative of returns from scanning the surrounding terrain; and
a processing circuit configured to:
receive the sensor signal;
classify the surrounding terrain using the sensor signal;
evaluate a library of acoustic data to determine an expected acoustic signature that corresponds to the classified surrounding terrain; and
create an acoustic cost map with the expected acoustic signature.

10. The vehicle of claim 9, wherein the processing circuit is configured to determine a path that minimizes an aggregate expected acoustic signature between a starting location and a target location.

11. The vehicle of claim 10, further comprising a user interface, wherein the user interface is configured to convey information from the acoustic cost map to an operator.

12. The vehicle of claim 11, wherein the user interface includes a display configured to illustrate the acoustic cost map and the path.

13. The vehicle of claim 10, further comprising an autonomous vehicle control system including a steering system configured to navigate the vehicle along the path.

14. The vehicle of claim 9, further comprising an instrument coupled to the sensor, wherein the instrument interacts with the sensor to scan the surrounding environment as a plurality of discrete terrain units and the processing circuit evaluates the library of acoustic data to determine the expected acoustic signature for each of the plurality of discrete terrain units.

15. The vehicle of claim 14, further comprising a microphone, wherein the microphone senses a sound level as the vehicle traverses the terrain unit and outputs an observed acoustic signature.

16. The vehicle of claim 15, wherein the processing circuit is configured to receive the observed acoustic signature and output the observed acoustic signature to at least one of a second vehicle and a memory device.

17. A method of operating a terrain classification system for a vehicle, comprising:
scanning a surrounding terrain with a sensor;
classifying the surrounding terrain with a processing circuit;
evaluating a library of acoustic data with the processing circuit to determine an expected acoustic signature;
associating the expected acoustic signature with the surrounding terrain using the processing circuit; and
creating an acoustic cost map with the processing circuit using the expected acoustic signature.

18. The method of claim 17, further comprising sensing a sound level of the vehicle with a microphone, the sound level defining an observed acoustic signature.

19. The method of claim 18, further comprising modifying at least one of the library and the acoustic cost map with the processing circuit when the observed acoustic signature is not equal to the expected acoustic signature.

20. The method of claim 17, further comprising defining at least two potential paths with the processing circuit between a starting location and a target location; retrieving a plurality of expected acoustic signatures for positions along the at least two potential paths; calculating a total acoustic cost for each of the at least two potential paths with the processing circuit by summing the plurality of expected acoustic signatures for positions along each of the at least two potential paths; and selecting the potential path having the smallest total acoustic cost.

* * * * *